US011774731B2

(12) United States Patent
Yanagisawa

(10) Patent No.: US 11,774,731 B2
(45) Date of Patent: Oct. 3, 2023

(54) OPTICAL SYSTEM, PROJECTOR, AND IMAGING APPARATUS

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 31 days.

(21) Appl. No.: 17/461,591

(22) Filed: Aug. 30, 2021

(65) Prior Publication Data

US 2022/0066180 A1 Mar. 3, 2022

(30) Foreign Application Priority Data

Aug. 31, 2020 (JP) ................................. 2020-145437

(51) Int. Cl.
*G02B 13/18* (2006.01)
*G03B 21/28* (2006.01)
*H04N 9/31* (2006.01)

(52) U.S. Cl.
CPC ............ *G02B 13/18* (2013.01); *G03B 21/28* (2013.01); *H04N 9/312* (2013.01); *H04N 9/3105* (2013.01); *H04N 9/3179* (2013.01)

(58) Field of Classification Search
CPC .... G03B 21/008; G03B 21/28; G03B 21/145; G03B 21/208; G03B 21/2053; G03B 21/2066; H04N 9/312; H04N 9/315; H04N 9/3105; H04N 9/3108; H04N 9/3132; H04N 9/3152; H04N 9/3179; G02B 13/00; G02B 13/0015; G02B 13/002; G02B 13/0045; G02B 13/0065; G02B 13/12; G02B 13/16; G02B 13/18
See application file for complete search history.

(56) References Cited

U.S. PATENT DOCUMENTS

| | | | |
|---|---|---|---|
| 7,048,388 B2 | 5/2006 | Takaura et al. | |
| 7,549,755 B2 | 6/2009 | Suzuki | |
| 7,677,738 B2* | 3/2010 | Kuwata | ................. G02B 13/16 353/77 |
| 10,645,353 B2* | 5/2020 | Matsuo | ............... G03B 21/147 |
| 2004/0156117 A1 | 8/2004 | Takaura et al. | |
| 2006/0193036 A1 | 8/2006 | Suzuki | |
| 2009/0213470 A1 | 8/2009 | Abe et al. | |

(Continued)

FOREIGN PATENT DOCUMENTS

| | | |
|---|---|---|
| CN | 101520592 A | 9/2009 |
| CN | 110780435 A | 2/2020 |

(Continued)

*Primary Examiner* — Sultan Chowdhury
(74) *Attorney, Agent, or Firm* — Oliff PLC

(57) ABSTRACT

An optical system forms an intermediate image between a reduction-side conjugate plane and a enlargement-side conjugate plane. The optical system includes a first optical system and a second optical system including a lens and disposed on the enlargement side of the first optical system. The lens has a first transmission surface, a reflection surface disposed on the enlargement side of the first transmission surface, and a second transmission surface disposed on the enlargement side of the reflection surface. At least one of the reflection surface and the second transmission surface is a free-form surface.

18 Claims, 24 Drawing Sheets

(56) References Cited

U.S. PATENT DOCUMENTS

| | | | | |
|---|---|---|---|---|
| 2010/0128233 | A1* | 5/2010 | Liu | G03B 21/28 |
| | | | | 362/97.3 |
| 2010/0265471 | A1* | 10/2010 | Hirata | G03B 21/145 |
| | | | | 353/70 |
| 2010/0283976 | A1* | 11/2010 | Hisada | G03B 21/28 |
| | | | | 353/70 |
| 2015/0029474 | A1 | 1/2015 | Tatsuno | |
| 2019/0011684 | A1 | 1/2019 | Ishihara et al. | |
| 2020/0033574 | A1 | 1/2020 | Morikuni | |
| 2020/0096847 | A1* | 3/2020 | Nagatoshi | G02B 27/149 |
| 2020/0341353 | A1* | 10/2020 | Guo | G03B 21/142 |
| 2020/0393749 | A1* | 12/2020 | Wang | G02B 13/16 |
| 2021/0033829 | A1 | 2/2021 | Ishigame | |

FOREIGN PATENT DOCUMENTS

| | | |
|---|---|---|
| JP | 2004-246042 A | 9/2004 |
| JP | 2006-235516 A | 9/2006 |
| JP | 2007-316674 A | 12/2007 |
| JP | 2014-130365 A | 7/2014 |
| JP | 2015-025979 A | 2/2015 |
| JP | 2017-156712 A | 9/2017 |
| JP | 2017-156713 A | 9/2017 |
| JP | 2017-156714 A | 9/2017 |
| JP | 2019-133061 A | 8/2019 |
| JP | 2020-042103 A | 3/2020 |
| JP | 2020-194115 A | 12/2020 |

* cited by examiner

FIG. 4
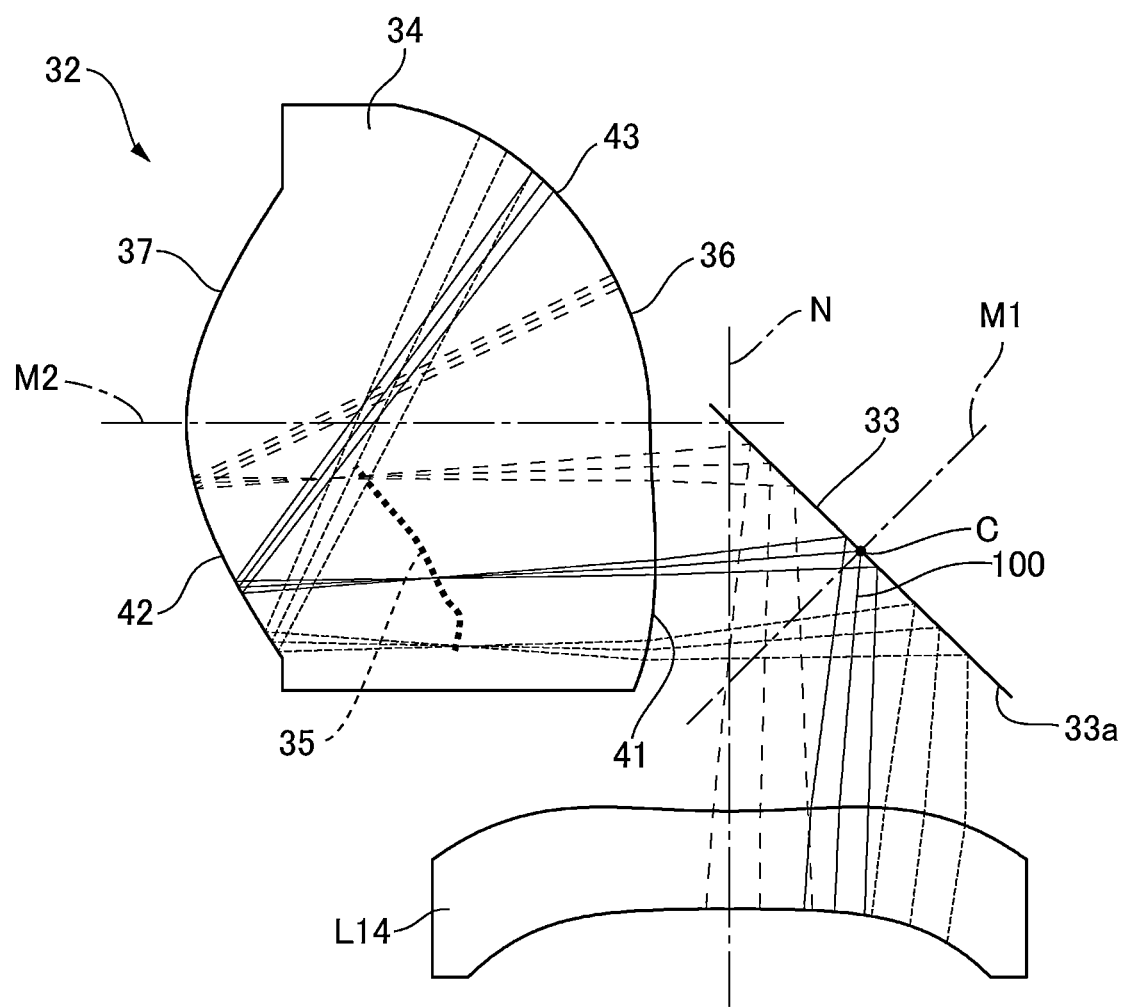
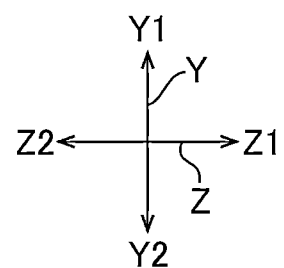

OPTICAL SYSTEM, PROJECTOR, AND IMAGING APPARATUS

The present application is based on, and claims priority from JP Application Serial Number 2020-145437, filed Aug. 31, 2020, the disclosure of which is hereby incorporated by reference herein in its entirety.

BACKGROUND

1. Technical Field

The present invention relates to an optical system, a projector, and an imaging apparatus.

2. Related Art

JP-A-2014-130365 describes a projector in which an optical system magnifies a projection image formed by an image formation device and projects the magnified image on a screen. The optical system described in JP-A-2014-130365 includes a first optical system including a plurality of lenses and a second optical system disposed on the enlargement side of the first optical system. The projection image is formed in the reduction-side image formation plane of the optical system, and the magnified image is formed in the enlargement-side image formation plane of the optical system. An intermediate image conjugate with the projection image and the magnified image is formed between the first optical system and the second optical system. The second optical system is formed of a single concave mirror. The reflection surface of the concave mirror has a free-form shape. In JP-A-2014-130365, the aspect ratio of the magnified image differs from the aspect ratio of the projection image.

The optical system described in JP-A-2014-130365 converts the aspect ratio of the magnified image with respect to the aspect ratio of the projection image by reducing the magnification factor of the projection image in the width direction. JP-A-2014-130365 does not describe an optical system that converts the aspect ratio of the magnified image with respect to the aspect ratio of the projection image by increasing the magnification factor of the projection image in the width direction.

SUMMARY

To solve the problem described above, an optical system according to the present disclosure forms an intermediate image between a reduction-side conjugate plane and an enlargement-side conjugate plane and includes a first optical system and a second optical system including a lens and disposed on an enlargement side of the first optical system. The lens has a first transmission surface, a reflection surface disposed on the enlargement side of the first transmission surface, and a second transmission surface disposed on the enlargement side of the reflection surface. At least one of the reflection surface and the second transmission surface is a free-form surface.

To solve the problem described above, another optical system according to the present disclosure forms an intermediate image between a reduction-side conjugate plane and an enlargement-side conjugate plane and includes a first optical system including a deflection member and a second optical system including a lens and disposed on an enlargement side of the first optical system. The deflection member has a light reflection surface and is disposed in a position closest to the enlargement side in the first optical system. The lens has a first transmission surface, a reflection surface disposed on the enlargement side of the first transmission surface, and a second transmission surface disposed on the enlargement side of the reflection surface. The reflection surface and the light reflection surface are each a free-form surface.

A projector according to the present disclosure includes a light modulator that modulates light emitted from a light source and the optical system described above that projects the light modulated by the light modulator.

An imaging apparatus according to the present disclosure includes the optical system described above and an imager disposed in the reduction-side conjugate plane where light emitted from the optical system is imaged.

BRIEF DESCRIPTION OF THE DRAWINGS

FIG. 4 is a beam diagram showing beams traveling via a lens located in a position closest to the enlargement side in a first optical system, a deflection member, and a second optical system in Example 1.

DESCRIPTION OF EXEMPLARY EMBODIMENTS

An optical system, a projector, and an imaging apparatus according to an embodiment of the present disclosure will be described below with reference to the drawings.

Projector

Figure 1:
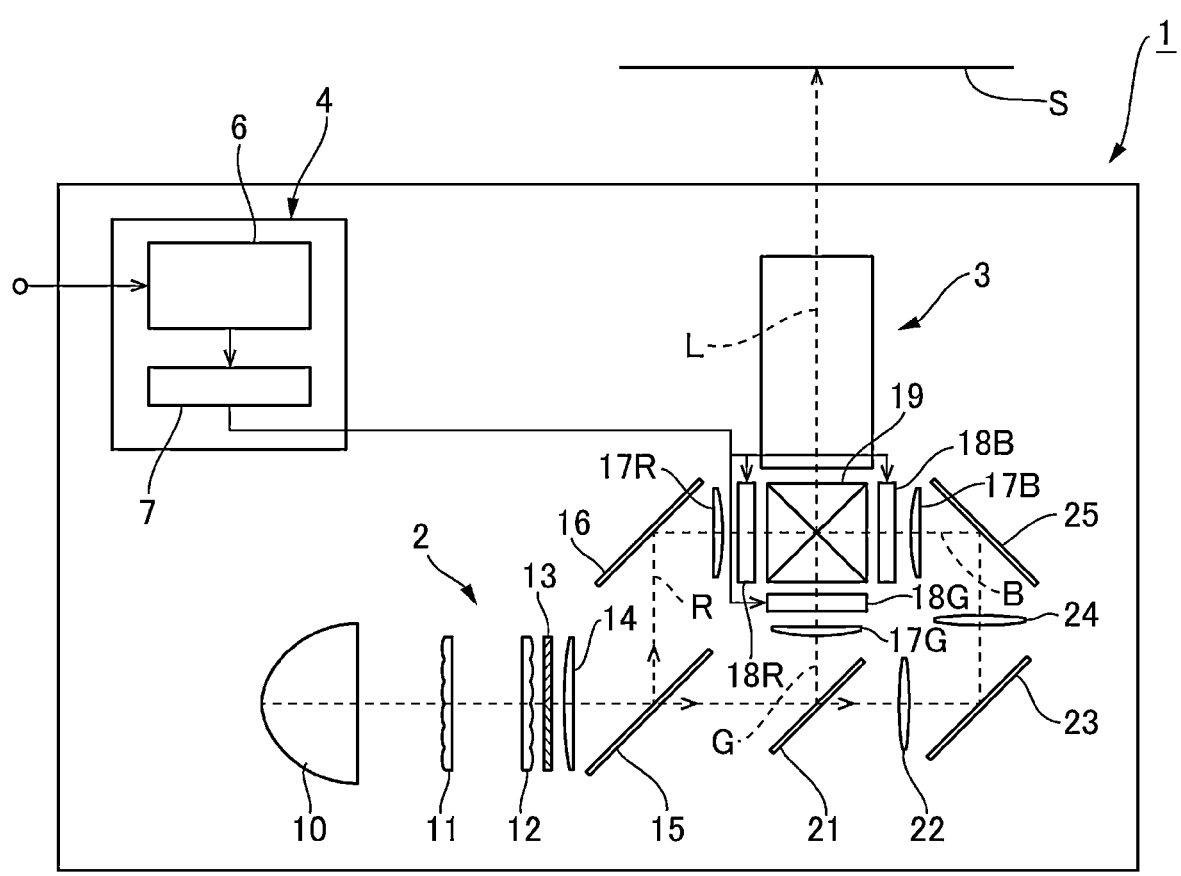
FIG. 1 is a schematic configuration diagram of a projector including an optical system.

FIG. 1 is a schematic configuration diagram of a projector including an optical system 3 according to the present disclosure. A projector 1 includes an image formation section 2, which generates a projection image to be projected on a screen S, the optical system 3, which magnifies the projection image and projects the magnified image on the screen S, and a controller 4, which controls the operation of the image formation section 2, as shown in FIG. 1.

Image Generation Optical System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the luminous flux from the light source 10 into a plurality of luminous fluxes. The lens elements of the first optical integration lens 11 focus the luminous flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display area of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the beam incident via the superimposing lens 14, and transmits G light and B light, which are part of the beam incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the beam via the first dichroic mirror 15, and transmits the B light, which is part of the beam via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround the cross dichroic prism 19 in such away that the liquid crystal panels 18R, 18G, and 18B face three sides of the cross dichroic prism 19. The cross dichroic prism 19 is a prism for light combination and produces a projection image that is the combination of the light modulated by the liquid crystal panel 18R, the light modulated by the liquid crystal panel 18G, and the light modulated by the liquid crystal panel 18B.

The optical system 3 magnifies and projects the projection images (images formed by liquid crystal panels 18R, 18G, and 18B) combined by the cross dichroic prism 19 on the screen S. The screen S is the enlargement-side conjugate plane of the optical system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Optical System

The optical system 3 will next be described. Examples 1 to 4 will be described below as examples of the configuration of the optical system 3 incorporated in the projector 1. In the beam diagrams of the optical systems according to Examples 1 to 4, the liquid crystal panels 18R, 18G, and 18B are referred to as liquid crystal panels 18.

Example 1

Figure 2:
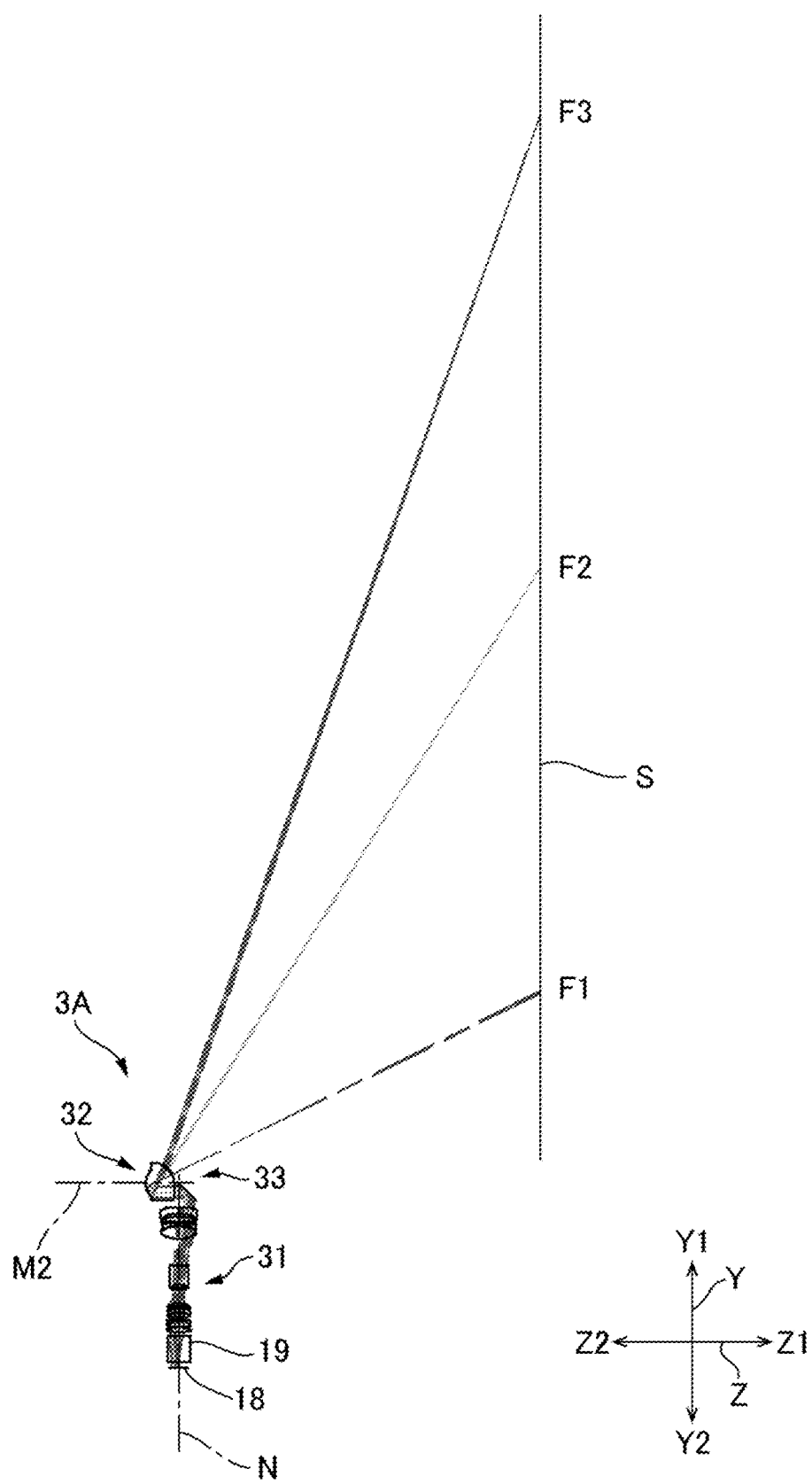
FIG. 2 is a beam diagram diagrammatically showing an entire optical system according to Example 1.
Figure 3:
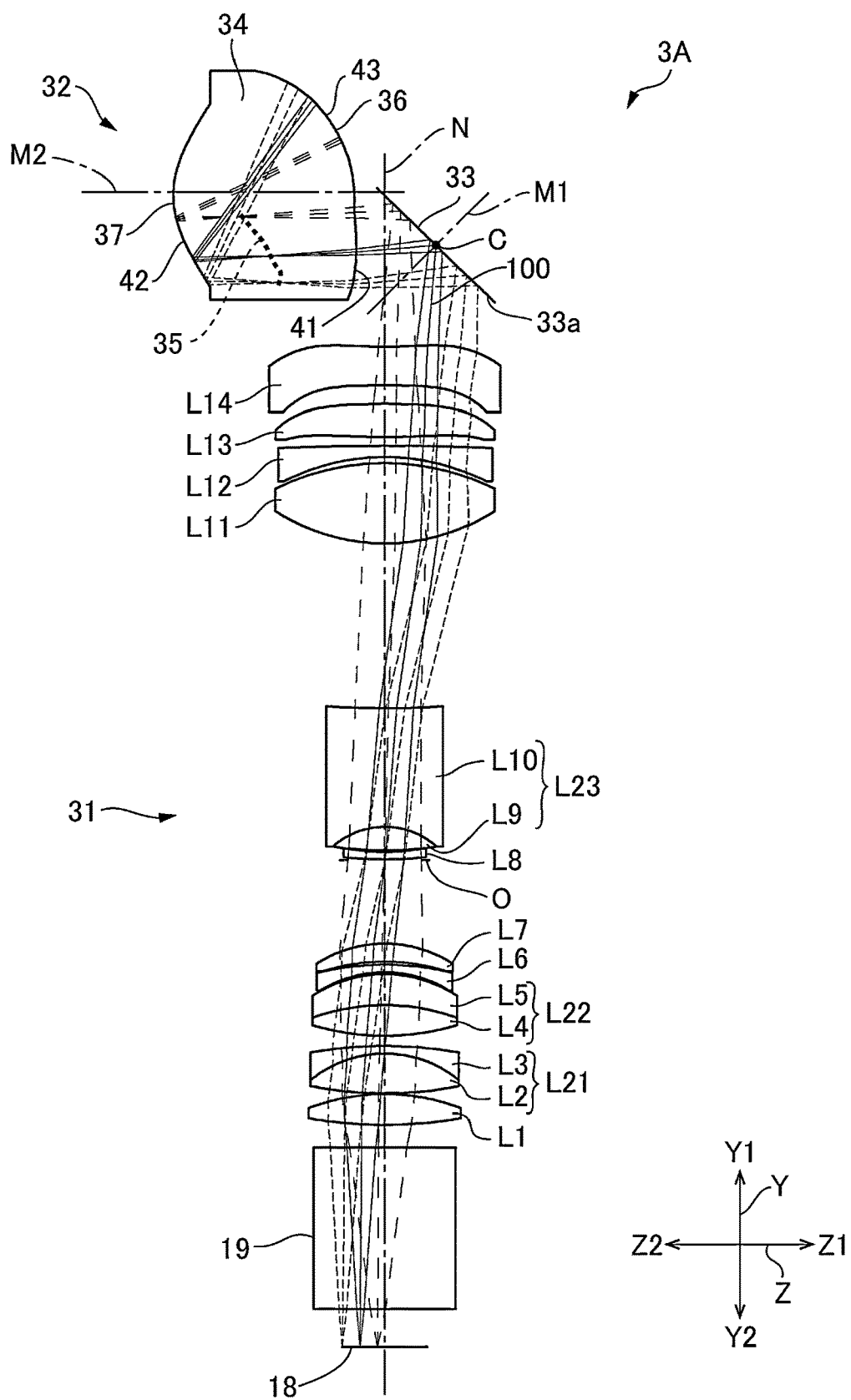
FIG. 3 is a beam diagram of the optical system according to Example 1.

FIG. 2 is a beam diagram diagrammatically showing an entire optical system according to Example 1. FIG. 2 diagrammatically shows luminous fluxes F1 to F3, which exit out of an optical system 3A according to the present example and reach the screen S. The luminous flux F1 is a luminous flux that reaches a smallest image height position. The luminous flux F3 is a luminous flux that reaches a largest image height position. The luminous flux F2 is a luminous flux that reaches a position between the position that the luminous flux F1 reaches and the position that the luminous flux F3 reaches. FIG. 3 is a beam diagram of the optical system 3A according to Example 1. FIG. 4 is a beam diagram showing beams traveling via the lens located in a position closest to the enlargement side in a first optical system, a deflection member, and a second optical system.

The optical system 3A in the present example is formed of a first optical system 31 and a second optical system 32 sequentially arranged from the reduction side toward the enlargement side, as shown in FIG. 3.

The first optical system 31 includes 14 lenses L1 to L14 and a deflection member 33. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The deflection member 33 is disposed on the enlargement side of the lens L14. The deflection member 33 is a reflection mirror having a light reflection surface 33a. The deflection member 33 is disposed in a position offset to one side of a first optical axis N of the lenses L1 to L14. The light reflection surface 33a is thus located on the one side of the first optical axis N. In the present example, the light reflection surface 33a inclines by 45° with respect to the first optical axis N. The beam that exits out of the lens L14 toward the light reflection surface 33a travels in a direction away from the first optical axis N. The optical path of the beam that exits out of the lens L14 toward the enlargement side is deflected by the light reflection surface 33a in the direction perpendicular to the first optical axis N.

In the following description, three axes perpendicular to one another are called axes X, Y, and Z for convenience. The axis Y coincides with the first optical axis N of the lenses L1 to L14. In an axis-Y direction along the axis Y, the direction toward the side where lens L1 is located is called a direction Y1, and the direction toward the side where lens L14 is located is called a direction Y2. The direction in which the deflection member 33 is offset from the first optical axis N is called an axis-Z direction. The direction toward the side where the light reflection surface 33a is located with respect to the first optical axis N is called a direction Z1, and the direction toward the opposite side is called a direction Z2.

In the description, the light reflection surface 33a is a free-form surface. Assuming that an imaginary plane containing the axes Y and Z is a first plane, the light reflection surface 33a has a shape symmetrical with respect to the first plane. In the present example, the light reflection surface 33a is an anamorphic surface. The light reflection surface 33a can instead be an XY polynomial surface, a fringe Zernike polynomial surface, a Zernike polynomial surface, or a Q2D free-form surface. A design axis M1 of the light reflection surface 33a is so set as to pass through a position C, where a chief ray 100 passes, the chief ray 100 being the chief ray of the beam traveling in the direction Y1 of the first optical axis N via the light reflection surface 33a. That is, the design axis M1 of the light reflection surface 33a is displaced from the first optical axis N toward the light reflection surface 33a.

The second optical system 32 is formed of a single lens 34. The lens 34 is made of glass or resin. The lens 34 is shifted in the direction Z2 from the deflection member 33. In more detail, the lens 34 is disposed on the side opposite the light reflection surface 33a with the first optical axis N interposed therebetween. The lens 34 has a first surface 36 facing in the direction Z1 and a second surface 37 facing in the direction Z2. The first surface 36 and the second surface 37 each have a convex shape. An optical axis M2 of the lens 34 extends in the axis-Z direction. The optical axis M2 of the lens 34 is therefore perpendicular to the first optical axis N of the lenses L1 to L14 of the first optical system 31. The lens 34 has a reflective coating layer on the second surface 37.

The lens 34 has a first transmission surface 41, a reflection surface 42, and a second transmission surface 43 sequentially arranged from the reduction side. The first transmission surface 41 is provided at the first surface 36. The first transmission surface 41 therefore has a convex shape. The reflection surface 42 is a reflective coating layer provided on the second surface 37 of the lens 34. The reflection surface 42 therefore has a concave shape to which the surface shape of the second surface 37 is transferred. The optical axis of the reflection surface 42 coincides with the optical axis M2 of the lens 34. The first transmission surface 41 and the reflection surface 42 are arranged in the axis-Z direction. The first transmission surface 41 and the reflection surface 42 are shifted in the direction Y2 from the optical axis M2 of the lens 34. The second transmission surface 43 is provided at the first surface 36. The second transmission surface 43 therefore has a convex shape. The first transmission surface 41 and the second transmission surface 43 are arranged in the axis-Y direction. The second transmission surface 43 is shifted in the direction Y1 from the optical axis M2 of the lens 34.

In the present example, the first transmission surface 41, the reflection surface 42, and the second transmission surface 43 are each a free-form surface. Further, the first transmission surface 41, the reflection surface 42, and the second transmission surface 43 each have a shape symmetrical with respect to the first plane. The first transmission surface 41, the reflection surface 42, and the second transmission surface 43 are each an anamorphic surface. The first transmission surface 41, the reflection surface 42, and the second transmission surface 43 can each instead be a free-form surface having different shapes in the directions X and Y, such as an XY polynomial surface, a fringe Zernike polynomial surface, a Zernike polynomial surface, or a Q2D free-form surface. The first transmission surface 41, the reflection surface 42, and the second transmission surface 43 are each designed with the optical axis M2 of the reflection surface 42 used as a design reference axis. At least one of the first transmission surface 41, the reflection surface 42, and the second transmission surface 43 may not be a free-form surface.

The liquid crystal panels 18 of the image formation section 2 are disposed in the reduction-side conjugate plane of the optical system 3A. The liquid crystal panels 18 form projection images on the side shifted in the direction Z2 from the first optical axis N. The screen S is disposed in the enlargement-side conjugate plane of the optical system 3A. The screen S is shifted in the direction Z1 from the first optical axis N. The height direction of the screen is the direction along the axis Y, and the width direction of the screen is the direction along the axis X.

The optical system 3A forms an intermediate image 35, which is conjugate with the reduction-side and enlargement-side conjugate planes, between the reduction-side conjugate plane and the enlargement-side conjugate plane. In the present example, the intermediate image 35 is formed between the light reflection surface 33a of the deflection member 33 and the reflection surface 42 of the lens 34. More specifically, the intermediate image 35 is formed between the first transmission surface 41 and the reflection surface 42 of the lens 34. The intermediate image 35 is shifted in the direction Y2 from the optical axis M2 of the reflection surface 42.

Lens Data

Data on the lenses of the optical system 3A are listed below. The surfaces of the lenses are numbered sequentially from the reduction side toward the enlargement side. Reference characters are given to the liquid crystal panels, the dichroic prism, the lenses, the deflection member, the first transmission surface, the reflection surface, the second transmission surface, and the screen. Data labeled with a surface number that does not correspond to any of the liquid crystal panels, the dichroic prism, the lenses, the deflection member, the first transmission surface, the reflection surface, the second transmission surface, and the screen is dummy data. Reference character R denotes the radius of curvature. Reference character D denotes the on-axis inter-surface distance. Reference character C denotes the aperture radius, and twice the aperture radius is the diameter of the lens surface. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.5728 |
| | 2 | Spherical | Infinity | 3.0000 | | Refraction | 9.6430 |
| | 3 | Spherical | Infinity | 0.0000 | | Refraction | 10.1058 |
| | 4 | Spherical | Infinity | 0.0000 | | Refraction | 10.1058 |
| | 5 | Spherical | Infinity | 0.0000 | | Refraction | 10.1058 |
| L1 | 6 | Spherical | 55.9095 | 4.0253 | 483013.8026 | Refraction | 10.2531 |
| | 7 | Spherical | −27.1743 | 0.1000 | | Refraction | 10.2965 |
| L2 | 8 | Spherical | 47.4385 | 5.3129 | 450307.8288 | Refraction | 9.8482 |
| L3 | 9 | Spherical | −14.8933 | 1.0000 | 842065.2841 | Refraction | 9.7421 |
| | 10 | Spherical | −54.8116 | 1.3950 | | Refraction | 9.9917 |
| L4 | 11 | Spherical | 32.2801 | 4.0889 | 456482.8109 | Refraction | 9.8711 |
| L5 | 12 | Spherical | −26.7096 | 4.1270 | 482866.803 | Refraction | 9.7888 |
| | 13 | Spherical | −16.6304 | 0.2445 | | Refraction | 9.4546 |
| L6 | 14 | Spherical | −15.7295 | 1.0000 | 836586.351 | Refraction | 9.3576 |
| | 15 | Spherical | −36.9184 | 0.4170 | | Refraction | 9.5770 |
| L7 | 16 | Spherical | −25.5127 | 2.4076 | 481806.6937 | Refraction | 9.5929 |
| | 17 | Spherical | −16.0024 | 11.0686 | | Refraction | 8.0771 |
| 0 | 18 | Spherical | Infinity | 0.1000 | | Refraction | 4.8152 |
| L8 | 19 | Spherical | 49.0908 | 1.0000 | 642496.4376 | Refraction | 4.7864 |
| | 20 | Spherical | 24.9317 | 0.2391 | | Refraction | 5.2226 |
| L9 | 21 | Spherical | 48.6771 | 3.1071 | 731417.2722 | Refraction | 5.2289 |
| L10 | 22 | Spherical | −9.9808 | 15.8582 | 777487.4899 | Refraction | 5.1966 |
| | 23 | Spherical | 118.5765 | 21.9159 | | Refraction | 7.3812 |
| L11 | 24 | Spherical | 25.5893 | 10.7217 | 547355.6835 | Refraction | 15.6189 |
| | 25 | Spherical | −31.1716 | 0.8054 | | Refraction | 15.4891 |
| L12 | 26 | Spherical | −28.1574 | 1.5354 | 846295.2379 | Refraction | 15.1358 |
| | 27 | Spherical | −276.8057 | 1.1363 | | Refraction | 15.4014 |
| L13 | 28 | Aspheric | 82.0346 | 4.3765 | E48R_ZEON | Refraction | 15.3958 |
| | 29 | Aspheric | −91.3792 | 2.4865 | | Refraction | 15.6595 |
| L14 | 30 | Aspheric | −155.531 | 5.0911 | E48R_ZEON | Refraction | 15.1811 |
| | 31 | Aspheric | 47.0246 | 0.2132 | | Refraction | 17.1113 |
| | 32 | Spherical | Infinity | 20.0000 | | Refraction | 16.7997 |
| | 33 | Spherical | Infinity | 0.0000 | | Refraction | 21.5257 |
| 33 | 34 | Anamorphic | 967.3805 | −9.3950 | | Reflection | 13.4274 |
| | 35 | Spherical | Infinity | 0.0000 | | Refraction | 15.4599 |
| | 36 | Spherical | Infinity | −4.0000 | | Refraction | 15.4599 |
| 41 | 37 | Anamorphic | 34.2605 | −23.4735 | Z330R_ZEON | Refraction | 15.1254 |
| | 38 | Spherical | Infinity | 0.0000 | Z330R_ZEON | Refraction | 13.3076 |
| 42 | 39 | Anamorphic | 8.8508 | 0.0000 | Z330R_ZEON | Reflection | 13.2270 |
| | 40 | Spherical | Infinity | 23.4735 | Z330R_ZEON | Refraction | 32.4939 |
| 43 | 41 | Anamorphic | −24.1854 | 65.8130 | | Refraction | 17.2197 |
| | 42 | Spherical | Infinity | 56.8385 | | Refraction | 333.9991 |
| | 43 | Spherical | Infinity | 180.0883 | | Refraction | 561.3098 |
| S | 44 | Spherical | Infinity | 0.0000 | | Refraction | 1282.8575 |

Aspheric constants are listed below.

| Surface number | S28 | S29 | S30 | S31 |
|---|---|---|---|---|
| Radius of curvature in axis-Y direction | 82.0346 | −91.3792 | −155.5310 | 47.0246 |
| Conic constant (K) | 21.76618956 | −61.82417386 | 90 | 0 |
| Fourth-order coefficient (A) | −4.63110E−05 | −1.90366E−05 | −6.15509E−05 | −1.46009E−04 |
| Sixth-order coefficient (B) | −1.18770E−08 | −3.09851E−07 | −3.53831E−07 | 2.74250E−07 |
| Eighth-order coefficient (C) | −2.97251E−10 | 4.31672E−10 | 9.90327E−10 | −2.71262E−10 |

Anamorphic surface coefficients are listed below.

| Surface number | S34 | S37 | S39 | S41 |
|---|---|---|---|---|
| Radius of curvature in axis-X direction | 967.3805 | 34.2605 | 8.8508 | −24.1854 |
| Radius of curvature in axis-Y direction | −51042.3167 | 35.1877 | 11.5067 | −16.5806 |

-continued

| Surface number | S34 | S37 | S39 | S41 |
|---|---|---|---|---|
| Conic constant in axis-Y direction | 0 | −85.14430 | −3.95502 | −0.03193 |
| Fourth-order coefficient in axis-Y direction | 4.83961E−14 | −9.19132E−05 | 5.42411E−05 | −1.29994E−05 |
| Sixth-order coefficient in axis-Y direction | −2.28441E−09 | 3.84046E−07 | −3.48032E−07 | 1.93392E−07 |
| Eighth-order coefficient in axis-Y direction | 6.25519E−12 | −1.10416E−09 | 1.17205E−09 | −7.25471E−10 |
| Tenth-order coefficient in axis-Y direction | 4.86331E−15 | 8.07984E−13 | −2.06713E−12 | 9.27923E−13 |
| Conic constant in axis-X direction | 0 | −65.23158 | −2.89645 | 0.83773 |
| Fourth-order coefficient in axis-X direction | 2.17324E+03 | −8.20698E−04 | 9.70725E−02 | −1.82868E−01 |
| Sixth-order coefficient in axis-X direction | 4.05570E−01 | 7.11271E−03 | 6.09435E−02 | 2.05477E−01 |
| Eighth-order coefficient in axis-X direction | −2.31214E−01 | 5.07927E−03 | 6.07235E−02 | 2.08498E−01 |
| Tenth-order coefficient in axis-X direction | 9.71706E−01 | −2.58030E−02 | 4.16617E−02 | 2.02584E−01 |

A screen width magnification ratio, a display device width, the numerical aperture, and TR of the optical system 3A are listed below. The screen width magnification ratio is the quotient of the division of the widthwise value in the aspect ratio of the magnified image projected on the screen S by the widthwise value in the aspect ratio of the projection image formed on the surface of each of the liquid crystal panels 18. The display device width is a width dimension of the surface of each of the liquid crystal panels 18 and is expressed in millimeters. The numerical aperture is abbreviated to NA. TR stands for the throw ratio and is the quotient of the division of the projection distance by the axis-X-direction dimension of the projection image projected on the screen S.

Screen width magnification ratio 1.35
Display device width [mm] 8.196
NA 0.198
TR(0.37"16:9) 0.169

Figure 5:
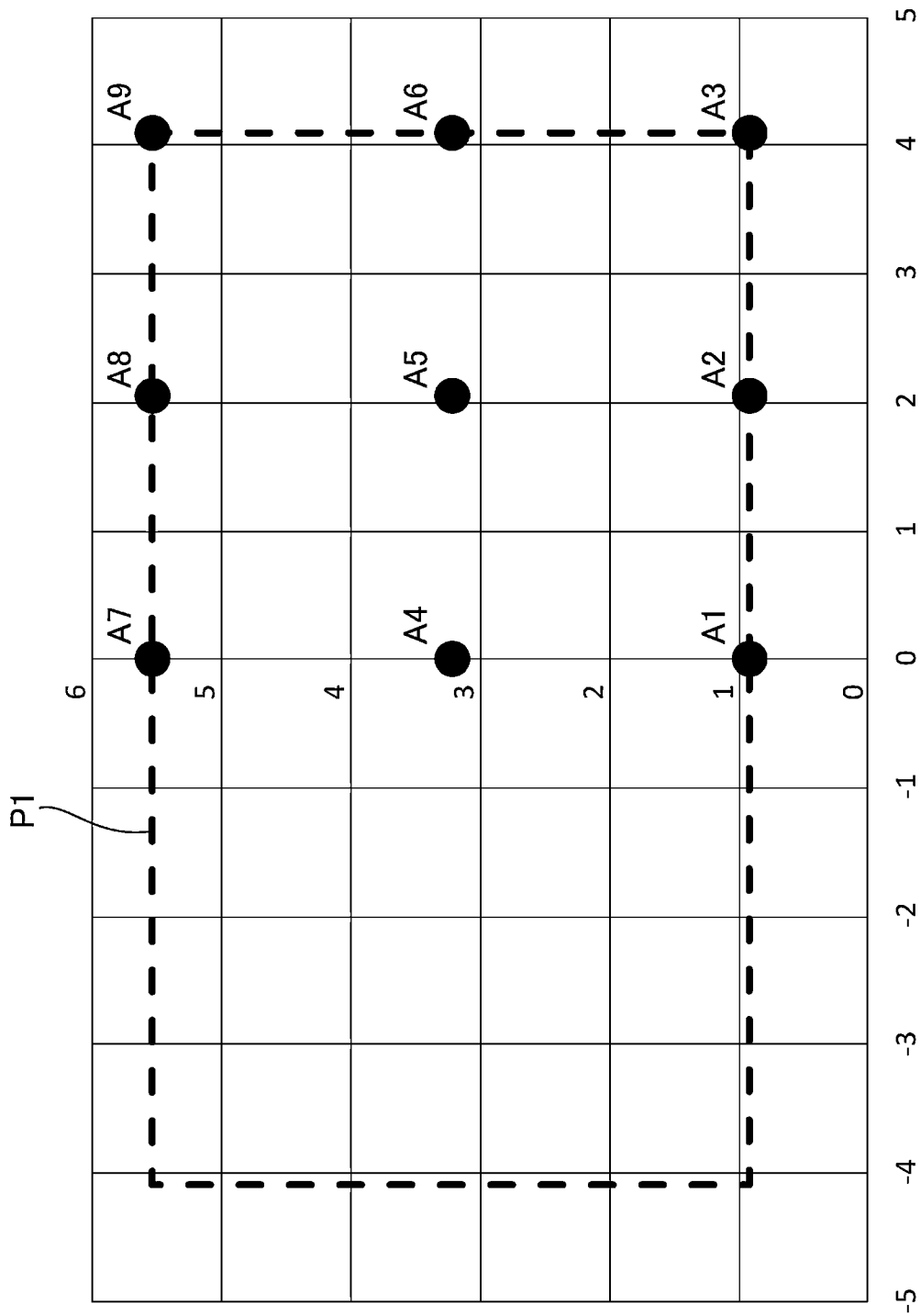
FIG. 5 shows the range of a projection image on liquid crystal panels in Example 1.
Figure 6:
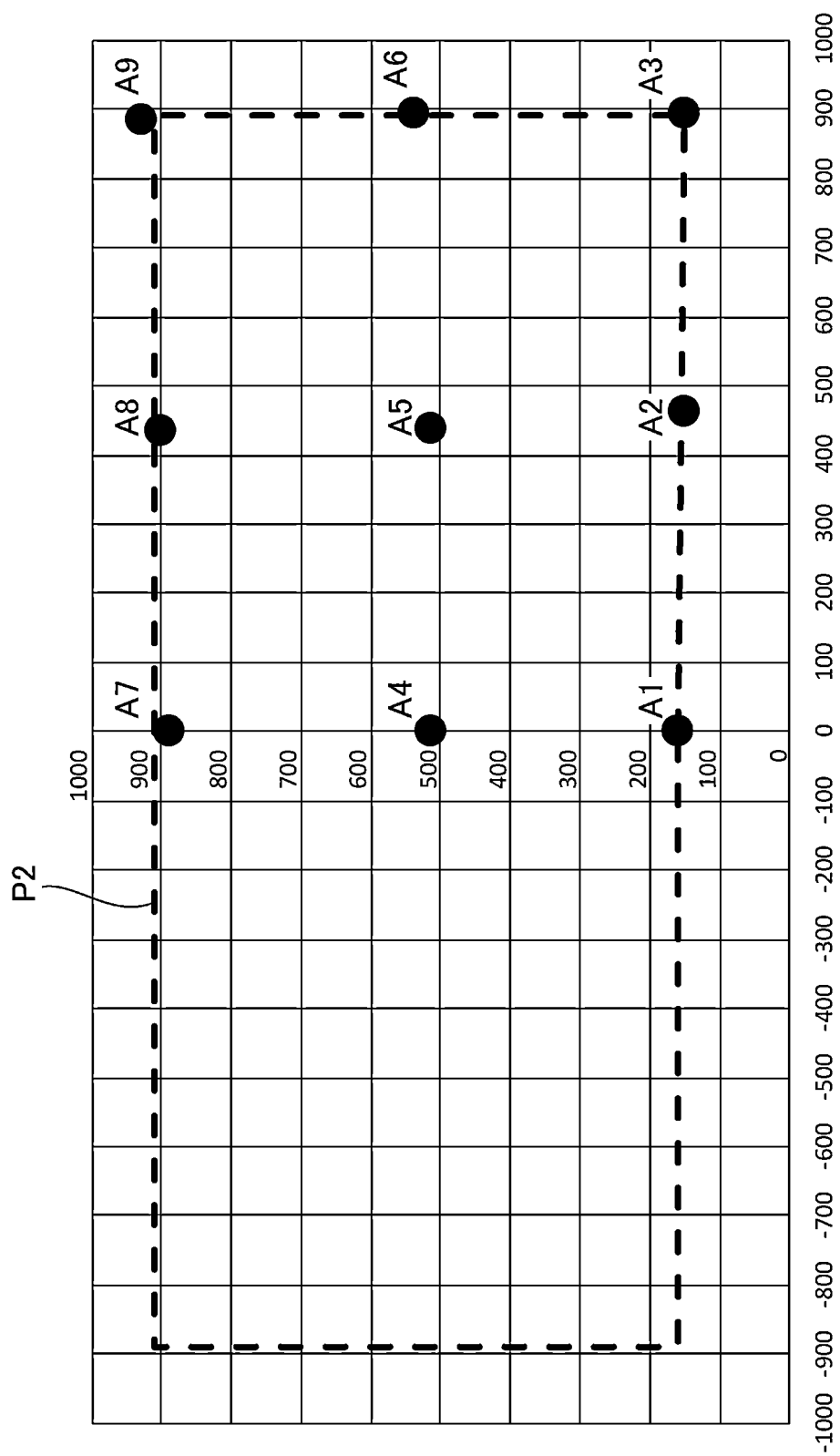
FIG. 6 shows the range of a magnified image on a screen in Example 1.

The screen width magnification ratio in the present example will be described with reference to FIGS. 5 and 6. FIG. 5 shows the range of a projection image P1 on the liquid crystal panels 18. FIG. 6 shows the range of a magnified image P2 on the screen S. The positions of nine luminous fluxes A1 to A9 are set in the right half of the projection image P1 in FIG. 5. "A4" in FIG. 5 represents the central luminous flux at the center of the projection image P1. In the magnified image P2 in FIG. 6, the positions A1 to A9 represent the positions that the luminous fluxes having exited from A1 to A9 in the projection image P1 reach. The optical system 3A according to the present example projects the magnified image P2 having a widthwise value in the aspect ratio being "1.35" times greater than the widthwise value in the aspect ratio of the projection image P1 formed on the liquid crystal panels 18.

Effects and Advantages of Example 1

The present example relates to the optical system 3A, which forms the intermediate image 35 between the reduction-side and enlargement-side conjugate planes and includes the first optical system 31 and the second optical system 32 disposed on the enlargement side of the first optical system 31. The first optical system 31 includes the deflection member 33 located in a position closest to the enlargement side in the first optical system 31 and having the light reflection surface 33a. The second optical system 32 includes a lens having the first transmission surface 41, the reflection surface 42, and the second transmission surface 43 sequentially arranged from the reduction side toward the enlargement side. The reflection surface 42 and the light reflection surface 33a are each a free-form surface.

According to the present example, the reflection surface 42 of the lens 34 and the light reflection surface 33a of the deflection member 33 are each a free-form surface. The effect of the reflection surface 42 and the light reflection surface 33a therefore allows conversion of the aspect ratio between the projection image in the reduction-side conjugate plane and the magnified image in the enlargement-side conjugate plane. Therefore, for example, as compared with a case where only the effect of the reflection surface 42 causes conversion of the aspect ratio between the projection image and the magnified image, the present example provides a high degree of flexibility in conversion of the aspect ratio. The present example therefore allows conversion of the aspect ratio between the projection image and the magnified image by enlargement the projection image in the axis-X direction.

In the present example, the first transmission surface 41 and the second transmission surface 43 are each a free-form surface. The effect of the reflection surface 42, the light reflection surface 33a, the first transmission surface 41, and the second transmission surface 43 allows conversion of the aspect ratio between the projection image in the reduction-side conjugate plane and the magnified image in the enlargement-side conjugate plane. The amount of conversion can therefore be increased in the present example as compared with the case where the aspect ratio is converted by the effect of the two surfaces, the reflection surface 42 and the light reflection surface 33*a*. The screen width magnification ratio can therefore be 1.35 times in the present example. At least one of the first transmission surface 41 and the second transmission surface 43 may not be a free-form surface.

In the present example, the intermediate image 35 is located on the reduction-side of the reflection surface 42. The intermediate image 35 can therefore be magnified by using the reflection surface 42 and the second transmission surface 43. The magnification of the optical system can therefore be increased.

In the present example, the second transmission surface 43 has a convex shape protruding toward the enlargement side. The magnification of the optical system can thus be more readily increased.

In the present example, the intermediate image 35 is located between the reflection surface 42 and the first transmission surface 41. The present example therefore allows the lens 34 and the deflection member 33 to approach each other as compared with a case where the intermediate image 35 is formed between the lens 34 and the deflection member 33. The optical system can therefore be readily compact.

In the present example, the first transmission surface 41 has a convex shape protruding toward the reduction side. The intermediate image 35 can therefore be readily formed between the first transmission surface 41 and the reflection surface 42.

Further, in the present example, in which the axis X (third axis), the axis Y (second axis), and the axis Z (first axis) are the three axes perpendicular to one another, and the optical axis M2 of the lens 34 coincide with the axis Z, the first transmission surface 41 and the reflection surface 42 are arranged along the axis Z, and the first transmission surface 41 and the second transmission surface 43 are arranged along the axis Y. Assuming that the first plane is an imaginary plane containing the axes Z and Y, the reflection surface 42 has a shape symmetrical with respect to the first plane. Therefore, even when the reflection surface 42 is a free-form surface, the reflection surface 42 is readily designed. Further, when the reflection surface 42 has a shape symmetrical with respect to the first plane, the reflection surface 42 can be readily manufactured.

Further, in the present example, the second transmission surface 43 has a shape symmetrical with respect to the first plane. Therefore, even when the second transmission surface 43 is a free-form surface, the second transmission surface 43 is readily designed. Further, when the second transmission surface 43 has a shape symmetrical with respect to the first plane, the second transmission surface 43 is readily manufactured. Similarly, in the present example, the first transmission surface 41 has a shape symmetrical with respect to the first plane. Therefore, even when the first transmission surface 41 is a free-form surface, the first transmission surface 41 is readily designed. Further, when the first transmission surface 41 has a shape symmetrical with respect to the first plane, the first transmission surface 41 is readily manufactured.

In the present example, the deflection member 33 is offset in the direction Z1 from the first optical axis N, and the light reflection surface 33*a* is therefore shifted in the direction Z1 from the first optical axis N. When the light reflection surface 33*a* is located on one side of the first optical axis N, aberration correction is readily performed by using the light reflection surface 33*a*.

The design axis M1 of the light reflection surface 33*a* is so set as to pass through the position C, where the chief ray 100 passes, the chief ray 100 being the chief ray of the beam traveling in the direction Y1 of the first optical axis N via the light reflection surface 33*a*. The position C corresponds to the chief ray of the central luminous flux at the center of the projection image P1. When the light reflection surface 33*a* is designed based on the design axis described above, the light reflection surface 33*a* that corrects aberrations produced by the optical system is readily designed.

Figure 7:
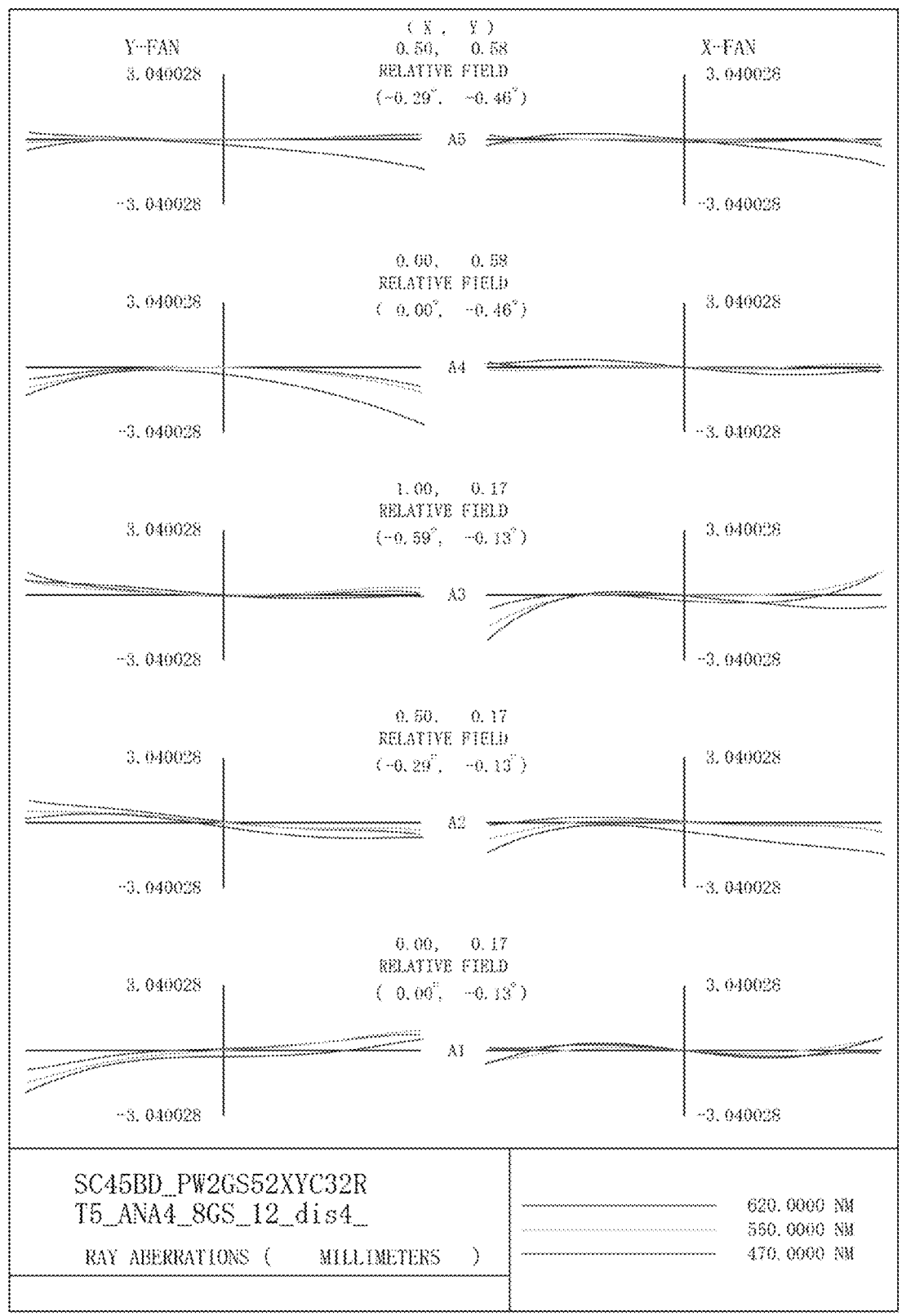
FIG. 7 shows lateral aberrations that occur in the image magnified by the optical system according to Example 1.
Figure 8:
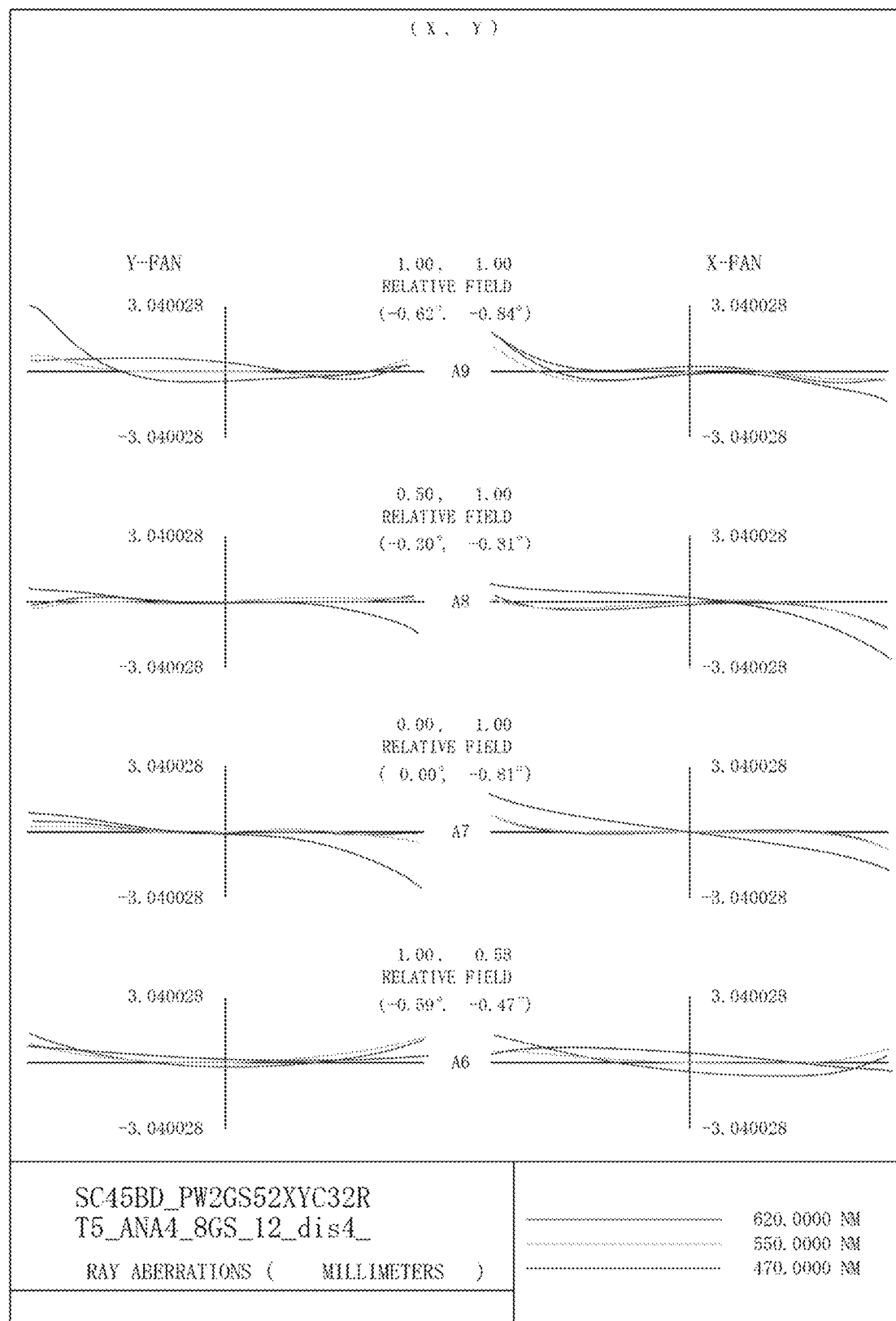
FIG. 8 shows lateral aberrations that occur in the image magnified by the optical system according to Example 1.

FIGS. 7 and 8 show lateral aberrations that occur in the image magnified by the optical system 3A. In FIGS. 7 and 8, A1 to A9 correspond to the positions of the luminous fluxes A1 to A9 in the magnified image P2 in FIG. 6. The lateral aberrations in the magnified image that are produced by the optical system 3A according to the present example are suppressed, as shown in FIGS. 7 and 8.

Example 2

Figure 9:
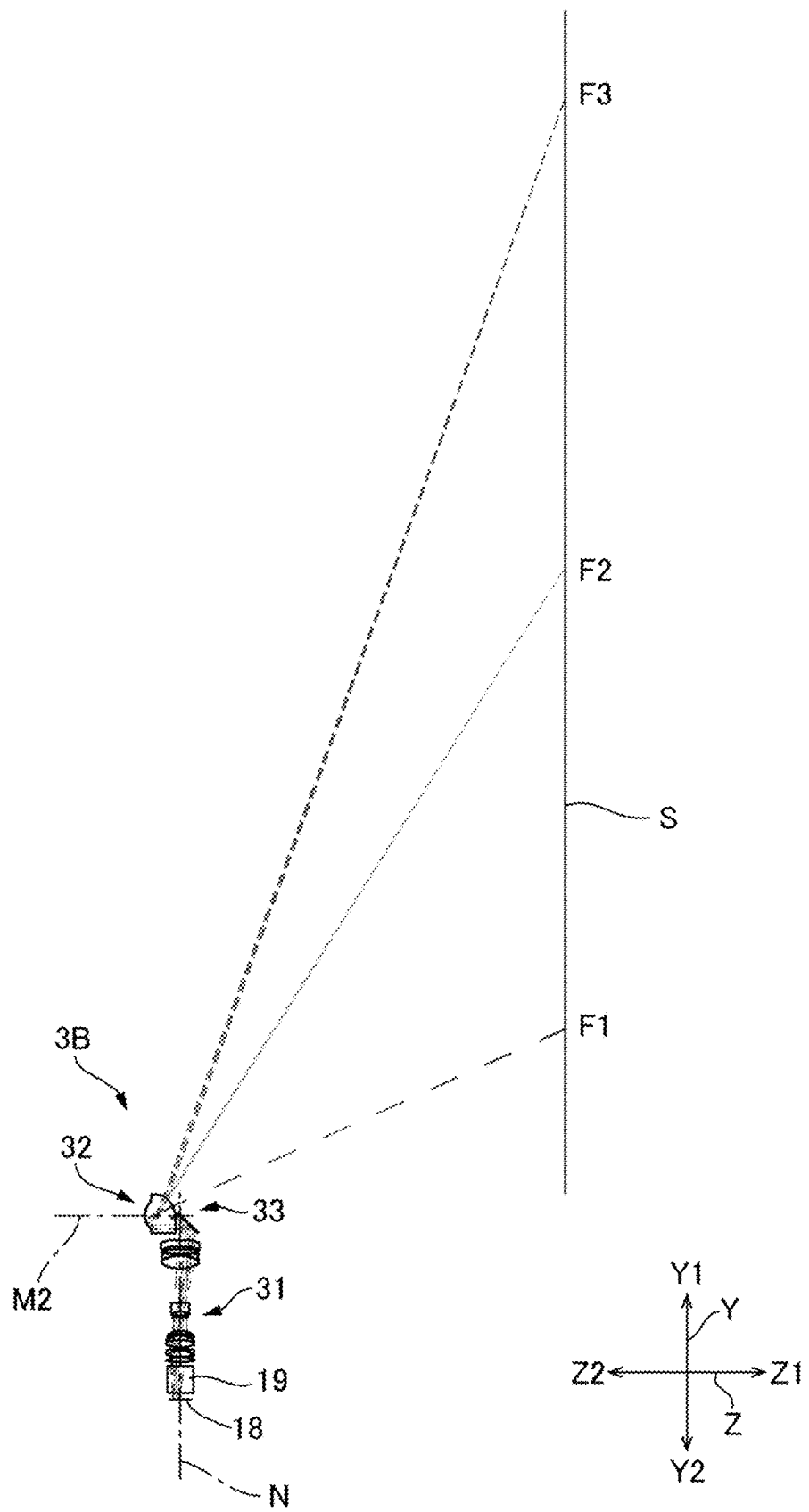
FIG. 9 is a beam diagram diagrammatically showing an entire optical system according to Example 2.
Figure 10:
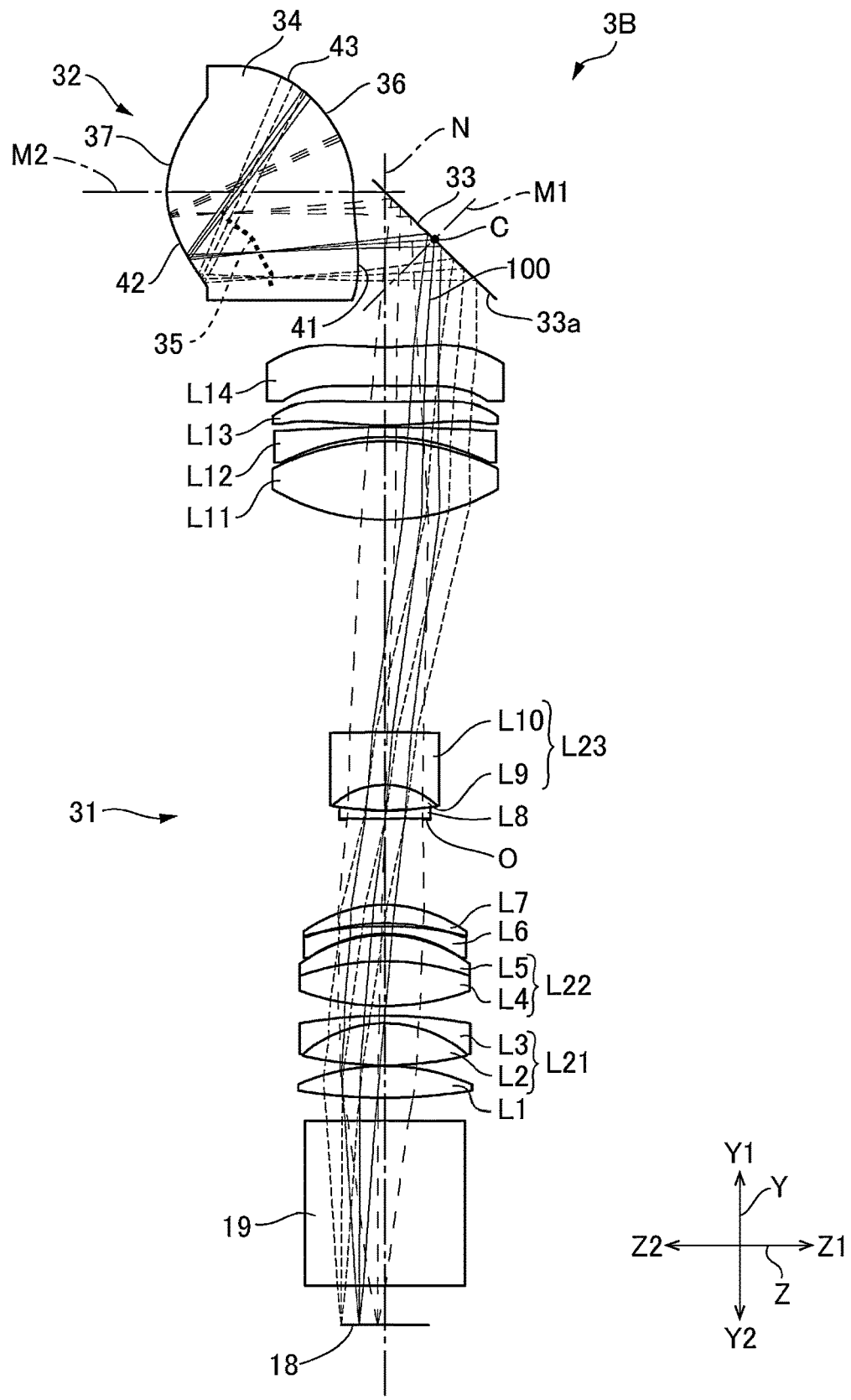
FIG. 10 is a beam diagram of the optical system according to Example 2.
Figure 11:
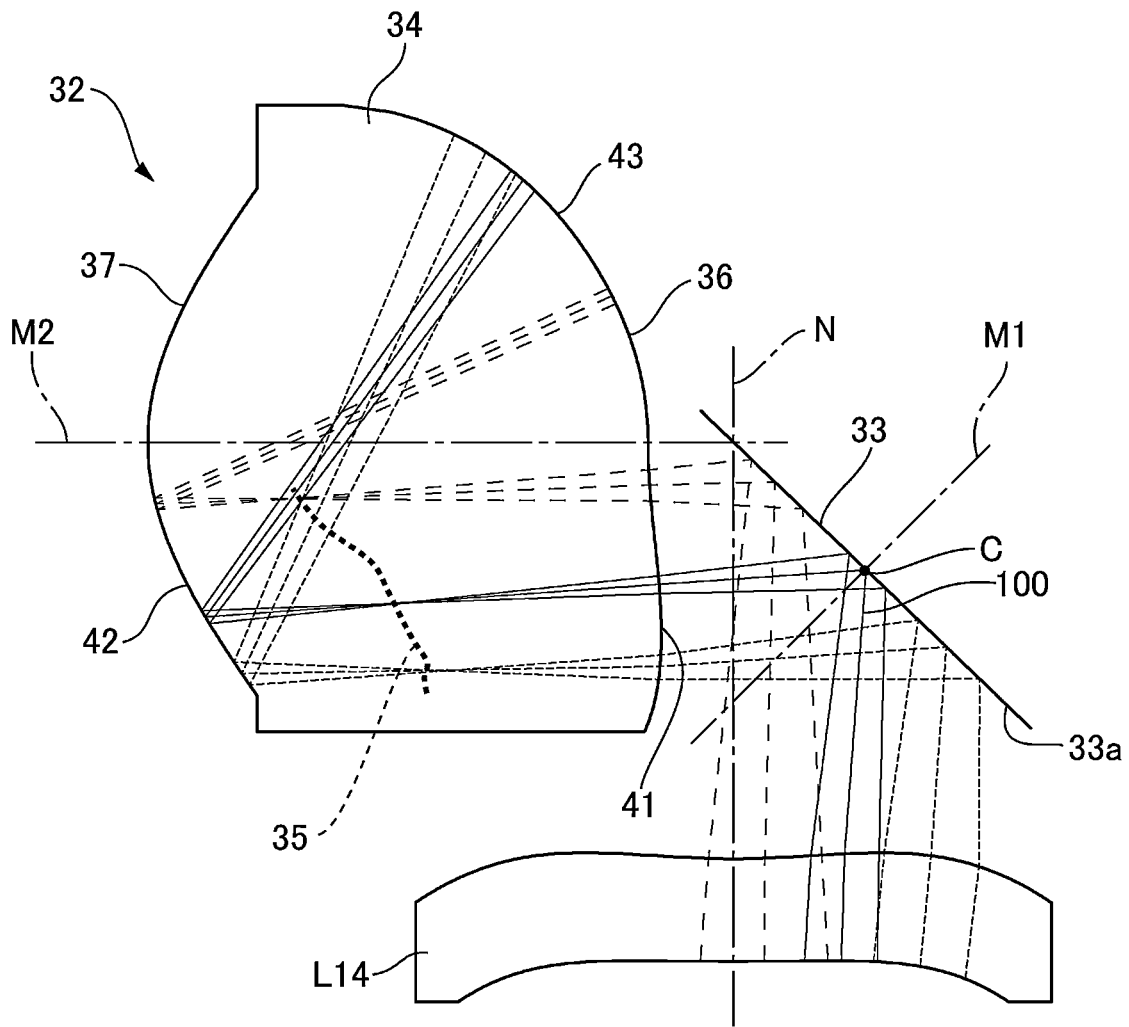
FIG. 11 is a beam diagram showing beams traveling via a lens located in a position closest to the enlargement side in a first optical system, a deflection member, and a second optical system in Example 2.

FIG. 9 is a beam diagram diagrammatically showing an entire optical system according to Example 2. FIG. 9 diagrammatically shows luminous fluxes F1 to F3, which exit out of an optical system 3B according to the present example and reach a screen S. The luminous flux F1 is a luminous flux that reaches a smallest image height position. The luminous flux F3 is a luminous flux that reaches a largest image height position. The luminous flux F2 is a luminous flux that reaches a position between the position that the luminous flux F1 reaches and the position that the luminous flux F3 reaches. FIG. 10 is a beam diagram of the optical system 3B according to Example 2. FIG. 11 is a beam diagram showing beams traveling via a lens located in a position closest to the enlargement side in a first optical system, a deflection member, and an second optical system.

The optical system 3B according to the present example is formed of a first optical system 31 and a second optical system 32 sequentially arranged from the reduction side toward the enlargement side, as shown in FIG. 10.

The first optical system 31 includes 14 lenses L1 to L14 and a deflection member 33. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The deflection member 33 is disposed on the enlargement side of the lens L14. The deflection member 33 is a reflection mirror having a light reflection surface 33*a*. The deflection member 33 is disposed in a position offset to one side of a first optical axis N of the lenses L1 to L14. The light reflection surface 33*a* is thus located on the one side of the first optical axis N. The light reflection surface 33*a* inclines by 45° with respect to the first optical axis N. The beam that exits out of the lens L14 toward the light reflection surface 33*a* travels in a direction away from the first optical axis N. The optical path of the beam that exits out of the lens L14 toward the enlargement side is deflected by the light reflection surface 33*a* in the direction perpendicular to the first optical axis N.

In the description, the light reflection surface 33*a* is a flat surface. A design axis M1 of the light reflection surface 33*a* is so set as to pass through a position C, where a chief ray 100 passes, the chief ray 100 being the chief ray of the beam traveling in the direction Y1 of the first optical axis N via the light reflection surface 33*a*. That is, the design axis M1 of the light reflection surface 33a is displaced from the first optical axis N toward the light reflection surface 33a.

The second optical system 32 is formed of a single lens 34. The lens 34 is made of glass or resin. The lens 34 is shifted in the direction Z2 from the deflection member 33. In more detail, the lens 34 is disposed on the side opposite the light reflection surface 33a with the first optical axis N interposed therebetween. The lens 34 has a first surface 36 oriented in the direction Z1 and a second surface 37 oriented in the direction Z2. The first surface 36 and the second surface 37 each have a convex shape. An optical axis M2 of the lens 34 extends in the axis-Z direction. The optical axis M2 of the lens 34 is therefore perpendicular to the first optical axis N of the lenses L1 to L14 of the first optical system 31. The lens 34 has a reflective coating layer on the second surface 37.

The lens 34 has a first transmission surface 41, a reflection surface 42, and a second transmission surface 43 sequentially arranged from the reduction side. The first transmission surface 41 is provided at the first surface. The first transmission surface 41 therefore has a convex shape. The reflection surface 42 is a reflective coating layer provided on the second surface 37 of the lens 34. The reflection surface 42 therefore has a concave shape to which the surface shape of the second surface 37 is transferred. The optical axis of the reflection surface 42 coincides with the optical axis M2 of the lens 34. The first transmission surface 41 and the reflection surface 42 are arranged in the axis-Z direction. The first transmission surface 41 and the reflection surface 42 are shifted in the direction Y2 from the optical axis M2 of the lens 34. The second transmission surface 43 is provided at the first surface 36. The second transmission surface 43 therefore has a convex shape. The first transmission surface 41 and the second transmission surface 43 are arranged in the axis-Y direction. The second transmission surface 43 is shifted in the direction Y1 from the optical axis M2 of the lens 34.

In the present example, the first transmission surface 41 has an aspherical shape. The reflection surface 42 and the second transmission surface 43 are each a free-form surface. The first transmission surface 41, the reflection surface 42, and the second transmission surface 43 each have a shape symmetrical with respect to the first plane. The reflection surface 42 and the second transmission surface 43 are each an anamorphic surface. The reflection surface 42 and the second transmission surface 43 can each instead be a free-form surface having different shapes in the directions X and Y, such as an XY polynomial surface, a fringe Zernike polynomial surface, a Zernike polynomial surface, or a Q2D free-form surface. The first transmission surface 41, the reflection surface 42, and the second transmission surface 43 are each designed with the optical axis M2 of the reflection surface 42 used as a design reference axis. At least one of the reflection surface 42 and the second transmission surface 43 may not be a free-form surface.

The liquid crystal panels 18 of the image formation section 2 are disposed in the reduction-side conjugate plane of the optical system 3B. The liquid crystal panels 18 form projection images on the side shifted in the direction Z2 from the first optical axis N. The screen S is disposed in the enlargement-side conjugate plane of the optical system 3B. The screen S is shifted in the direction Z1 from the first optical axis N. The height direction of the screen is the direction along the axis Y, and the width direction of the screen is the direction along the axis X.

The optical system 3B forms an intermediate image 35, which is conjugate with the reduction-side and enlargement-side conjugate planes, between the reduction-side conjugate plane and the enlargement-side conjugate plane. In the present example, the intermediate image 35 is formed between the light reflection surface 33a of the deflection member 33 and the reflection surface 42 of the lens 34. More specifically, the intermediate image 35 is formed between the first transmission surface 41 and the reflection surface 42 of the lens 34. The intermediate image 35 is shifted in the direction Y2 from the optical axis M2 of the reflection surface 42.

Lens Data

Data on the lenses of the optical system 3B are listed below. The surfaces of the lenses are numbered sequentially from the reduction side toward the enlargement side. Reference characters are given to the liquid crystal panels, the dichroic prism, the lenses, the deflection member, the first transmission surface, the reflection surface, the second transmission surface, and the screen. Data labeled with a surface number that does not correspond to any of the liquid crystal panels, the dichroic prism, the lenses, the deflection member, the first transmission surface, the reflection surface, the second transmission surface, and the screen is dummy data. Reference character R denotes the radius of curvature. Reference character D denotes the on-axis inter-surface distance. Reference character C denotes the aperture radius, and twice the aperture radius is the diameter of the lens surface. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7 OHARA | Refraction | 7.4712 |
| | 2 | Spherical | Infinity | 3.0000 | | Refraction | 9.2120 |
| | 3 | Spherical | Infinity | 0.0000 | | Refraction | 9.5974 |
| | 4 | Spherical | Infinity | 0.0000 | | Refraction | 9.5974 |
| | 5 | Spherical | Infinity | 0.0000 | | Refraction | 9.5974 |
| L1 | 6 | Spherical | 65.4704 | 4.1260 | 488931.7885 | Refraction | 9.6906 |
| | 7 | Spherical | −25.8779 | 0.1000 | | Refraction | 9.7448 |
| L2 | 8 | Spherical | 44.9399 | 5.4647 | 451548.8296 | Refraction | 9.2948 |
| L3 | 9 | Spherical | −15.1508 | 1.0000 | 841501.2942 | Refraction | 9.0409 |
| | 10 | Spherical | −56.8514 | 1.2690 | | Refraction | 9.1583 |
| L4 | 11 | Spherical | 30.3942 | 5.8367 | 461122.8106 | Refraction | 8.9197 |
| L5 | 12 | Spherical | −31.3995 | 3.3918 | 496228.7721 | Refraction | 8.4395 |
| | 13 | Spherical | −17.1030 | 0.1752 | | Refraction | 8.1083 |
| L6 | 14 | Spherical | −16.3515 | 1.0000 | 837496.3489 | Refraction | 8.0387 |
| | 15 | Spherical | −41.2304 | 0.4240 | | Refraction | 8.0687 |
| L7 | 16 | Spherical | −27.3170 | 2.3815 | 486259.7942 | Refraction | 8.0684 |
| | 17 | Spherical | −16.6374 | 11.0686 | | Refraction | 8.0771 |

-continued

| Reference character | Surface number | Shape | R | D | Glass material | Refraction/reflection | C |
|---|---|---|---|---|---|---|---|
| 0 | 18 | Spherical | Infinity | 0.1000 | | Refraction | 4.7977 |
| L8 | 19 | Spherical | 571.6975 | 1.0000 | 712249.3669 | Refraction | 4.7864 |
| | 20 | Spherical | 28.6986 | 0.1392 | | Refraction | 4.9318 |
| L9 | 21 | Spherical | 42.0590 | 3.3056 | 733962.2712 | Refraction | 4.9327 |
| L10 | 22 | Spherical | −9.4250 | 6.8878 | 774045.4946 | Refraction | 5.1253 |
| | 23 | Spherical | −292.8891 | 27.6142 | | Refraction | 6.3334 |
| L11 | 24 | Spherical | 27.2471 | 10.2488 | 555410.6726 | Refraction | 15.0865 |
| | 25 | Spherical | −29.4496 | 0.5422 | | Refraction | 14.9584 |
| L12 | 26 | Spherical | −27.3146 | 1.2583 | 846663.2378 | Refraction | 14.7737 |
| | 27 | Spherical | −192.8773 | 0.2815 | | Refraction | 15.0640 |
| L13 | 28 | Aspheric | 47.2244 | 2.9887 | E48R_ZEON | Refraction | 15.0640 |
| | 29 | Aspheric | 133.9404 | 2.1048 | | Refraction | 15.3315 |
| L14 | 30 | Aspheric | 171.9435 | 5.0055 | E48R_ZEON | Refraction | 15.2325 |
| | 31 | Aspheric | 39.9613 | 0.2905 | | Refraction | 16.5855 |
| | 32 | Spherical | Infinity | 20.0000 | | Refraction | 16.2826 |
| | 33 | Spherical | Infinity | 0.0000 | | Refraction | 20.7493 |
| 33 | 34 | Spherical | Infinity | −8.7830 | | Reflection | 13.1400 |
| | 35 | Spherical | Infinity | 0.0000 | | Refraction | 14.7281 |
| | 36 | Spherical | Infinity | −4.0000 | | Refraction | 14.7281 |
| 41 | 37 | Aspheric | 27.7983 | −23.4735 | Z330R_ZEON | Refraction | 14.4036 |
| | 38 | Spherical | Infinity | 0.0000 | Z330R_ZEON | Refraction | 13.0528 |
| 42 | 39 | Anamorphic | 9.5677 | 0.0000 | Z330R_ZEON | Reflection | 12.8083 |
| | 40 | Spherical | Infinity | 23.4735 | Z330R_ZEON | Refraction | 28.8972 |
| 43 | 41 | Anamorphic | −22.4938 | 65.8130 | | Refraction | 16.9147 |
| | 42 | Spherical | Infinity | 56.8385 | | Refraction | 316.3379 |
| | 43 | Spherical | Infinity | 180.0883 | | Refraction | 531.2282 |
| S | 44 | Spherical | Infinity | 0.0000 | | Refraction | 1212.0922 |

Aspheric constants are listed below.

| Surface number | S28 | S29 | S30 |
|---|---|---|---|
| Radius of curvature in axis-Y direction | 47.2244 | 133.9404 | 171.9435 |
| Conic constant (K) | −1.95000125 | 60.74248698 | 90 |
| Fourth-order coefficient (A) | −4.83769E−05 | −2.10815E−05 | −6.13575E−05 |
| Sixth-order coefficient (B) | −4.13808E−09 | −3.24296E−07 | −3.39127E−07 |
| Eighth-order coefficient (C) | −2.55845E−10 | 4.24487E−10 | 9.35575E−10 |
| Tenth-order coefficient (D) | | | |
| Twelfth-order coefficient (E) | | | |

| Surface number | S31 | S37 |
|---|---|---|
| Radius of curvature in axis-Y direction | 39.9613 | 27.7983 |
| Conic constant (K) | 0 | −28.28853946 |
| Fourth-order coefficient (A) | −1.49990E−04 | −6.92710E−05 |
| Sixth-order coefficient (B) | 2.68632E−07 | 2.63497E−07 |
| Eighth-order coefficient (C) | −2.37928E−10 | −1.26383E−09 |
| Tenth-order coefficient (D) | | 2.59141E−12 |
| Twelfth-order coefficient (E) | | −3.00520E−15 |

Anamorphic surface coefficients are listed below.

| Surface number | S39 | S41 |
|---|---|---|
| Radius of curvature in axis-X direction | 9.5677 | −22.4938 |
| Radius of curvature in axis-Y direction | 11.7375 | −15.5594 |
| Conic constant in axis-Y direction | −3.190223057 | −0.10651 |
| Fourth-order coefficient in axis-Y direction | 6.47141E−05 | −8.33250E−06 |
| Sixth-order coefficient in axis-Y direction | −3.75860E−07 | 1.92339E−07 |
| Eighth-order coefficient in axis-Y direction | 1.13758E−09 | −7.70099E−10 |
| Tenth-order coefficient in axis-Y direction | −1.79033E−12 | 1.07800E−12 |
| Conic constant in axis-X direction | −3.450952392 | 0.54644 |
| Fourth-order coefficient in axis-X direction | −6.05044E−02 | −1.40604E−01 |
| Sixth-order coefficient in axis-X direction | −3.24341E−02 | 2.79707E−01 |
| Eighth-order coefficient in axis-X direction | −1.09859E−02 | 2.66535E−01 |
| Tenth-order coefficient in axis-X direction | −7.88576E−03 | 2.56702E−01 |

A screen width magnification ratio, a display device width, the numerical aperture, and TR of the optical system 3B are listed below. The screen width magnification ratio is the quotient of the division of the widthwise value in the aspect ratio of the magnified image projected on the screen S by the widthwise value in the aspect ratio of the projection image formed on the surface of each of the liquid crystal panels 18. The display device width is a width dimension of the surface of each of the liquid crystal panels 18 and is expressed in millimeters. The numerical aperture is abbreviated to NA. TR stands for the throw ratio and is the quotient of the division of the projection distance by the axis-X-direction dimension of the projection image projected on the screen S.

Screen width magnification ratio 1.22
Display device width [mm] 8.196
NA 0.196
TR(0.37"16:9) 0.186

Figure 12:
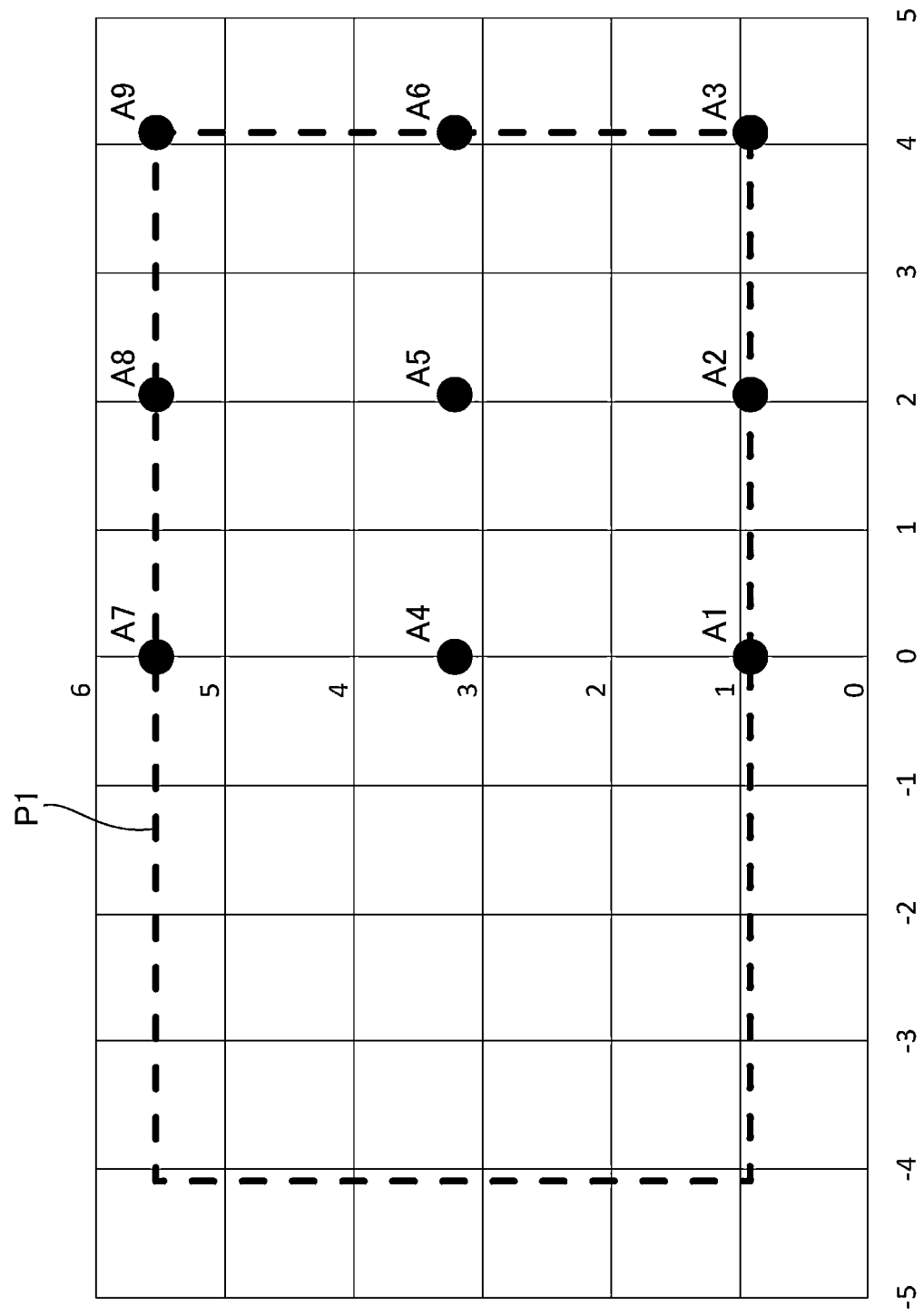
FIG. 12 shows the range of a projection image on liquid crystal panels in Example 2.
Figure 13:
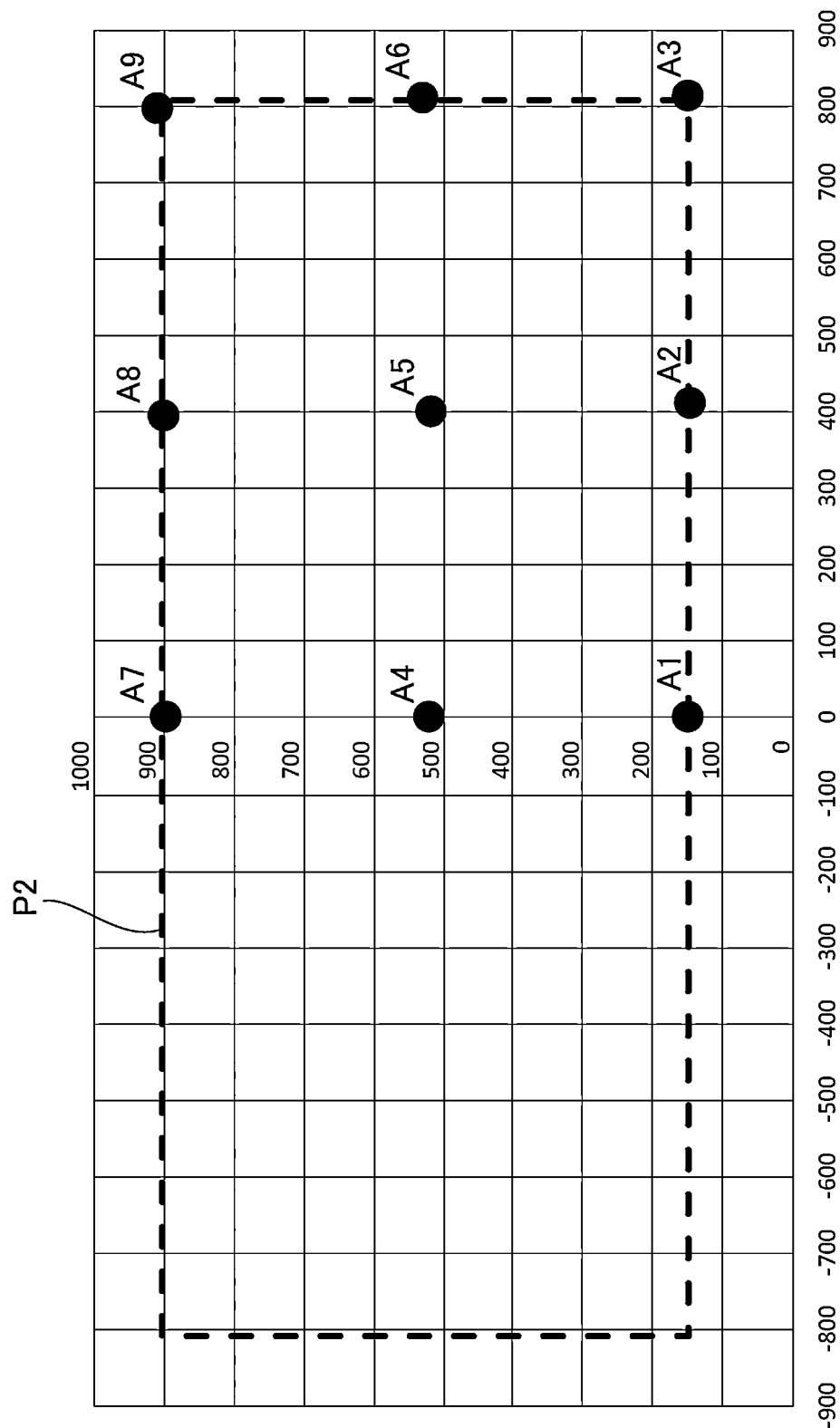
FIG. 13 shows the range of a magnified image on a screen in Example 2.

The screen width magnification ratio in the present example will be described with reference to FIGS. 12 and 13. FIG. 12 shows the range of a projection image P1 on the liquid crystal panels 18. FIG. 13 shows the range of a magnified image P2 on the screen S. The positions of nine luminous fluxes A1 to A9 are set in the right half of the projection image P1 in FIG. 12. "A4" in FIG. 12 represents the central luminous flux at the center of the projection image P1. In the magnified image P2 in FIG. 13, the positions A1 to A9 represent the positions that the luminous fluxes having exited from A1 to A9 in the projection image P1 reach. The optical system 3B according to the present example projects the magnified image P2 having a widthwise value in the aspect ratio being "1.22" times greater than the widthwise value in the aspect ratio of the projection image P1 formed on the liquid crystal panels 18.

Effects and Advantages of Example 2

The present example relates to the optical system 3B, which forms the intermediate image 35 between the reduction-side and enlargement-side conjugate planes and includes the first optical system 31 and the second optical system 32 disposed on the enlargement side of the first optical system 31. The second optical system 32 includes a lens 34 having the first transmission surface 41, the reflection surface 42, and the second transmission surface 43 sequentially arranged from the reduction side toward the enlargement side. The reflection surface 42 and the second transmission surface 43 are each a free-form surface.

In the optical system 3B according to the present example, the reflection surface 42 and the second transmission surface 43 are each a free-form surface. The effect of the reflection surface 42 and the second transmission surface 43 therefore allows conversion of the aspect ratio between the projection image in the reduction-side conjugate plane and the magnified image in the enlargement-side conjugate plane. Therefore, for example, as compared with a case where only the effect of the reflection surface 42 causes conversion of the aspect ratio between the projection image and the magnified image, the present example provides a high degree of flexibility in conversion of the aspect ratio. The present example therefore allows conversion of the aspect ratio between the projection image and the magnified image by enlargement the projection image in the axis-X direction.

In the present example, the effect of the two surfaces, the reflection surface 42 and the second transmission surface 43, causes conversion of the aspect ratio between the projection image in the reduction-side conjugate plane and the magnified image in the enlargement-side conjugate plane. The amount of aspect ratio conversion is therefore smaller than that in the optical system according to Example 1, in which the aspect ratio is converted by the effect of the four surfaces. The present example can provide the same effects and advantages as those provided by the optical system according to Example 1 except for the point described above.

In the present example, the light reflection surface 33a of the deflection member 33 is a flat surface. The manufacturing cost of the deflection member 33 can therefore be suppressed. The manufacturing cost of the optical system can thus be suppressed.

Figure 14:
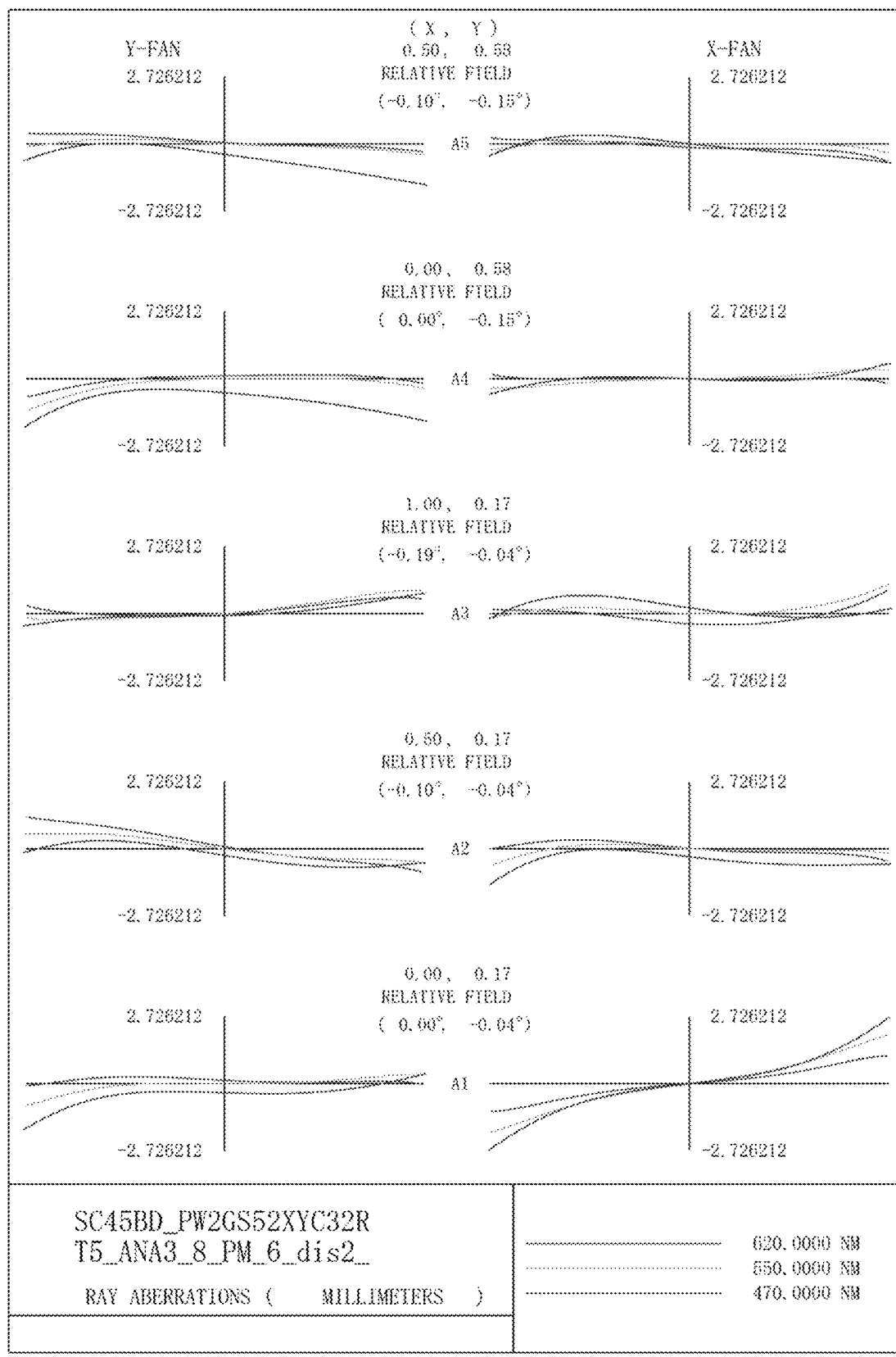
FIG. 14 shows lateral aberrations that occur in the image magnified by the optical system according to Example 2.
Figure 15:
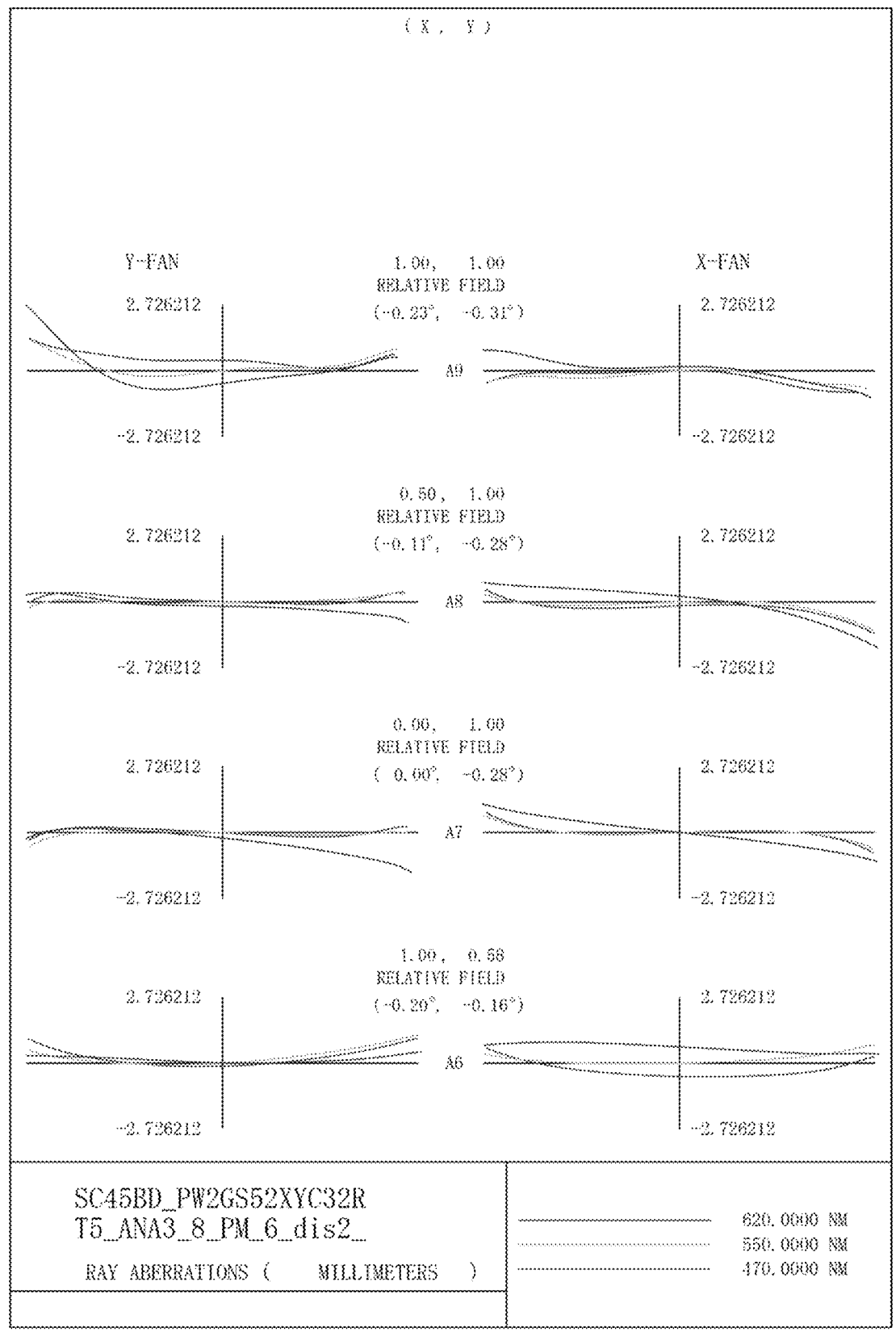
FIG. 15 shows the lateral aberrations that occur in the image magnified by the optical system according to Example 2.

FIGS. 14 and 15 show lateral aberrations that occur in the image magnified by the optical system 3B. In FIGS. 14 and 15, A1 to A9 correspond to the positions of the luminous fluxes A1 to A9 in the magnified image P2 in FIG. 13. The lateral aberrations in the magnified image that are produced by the optical system 3B according to the present example are suppressed, as shown in FIGS. 14 and 15.

In the present example, the deflection member 33 can be omitted. In this case, for example, the lens 34 is disposed in the first optical axis N of the lenses L1 to L14 so that the optical axis M2 of the lens 34 coincides with the first optical axis N. The beam traveling via L14 toward the enlargement side may then be caused to be incident on the first transmission surface 41.

Example 3

Figure 16:
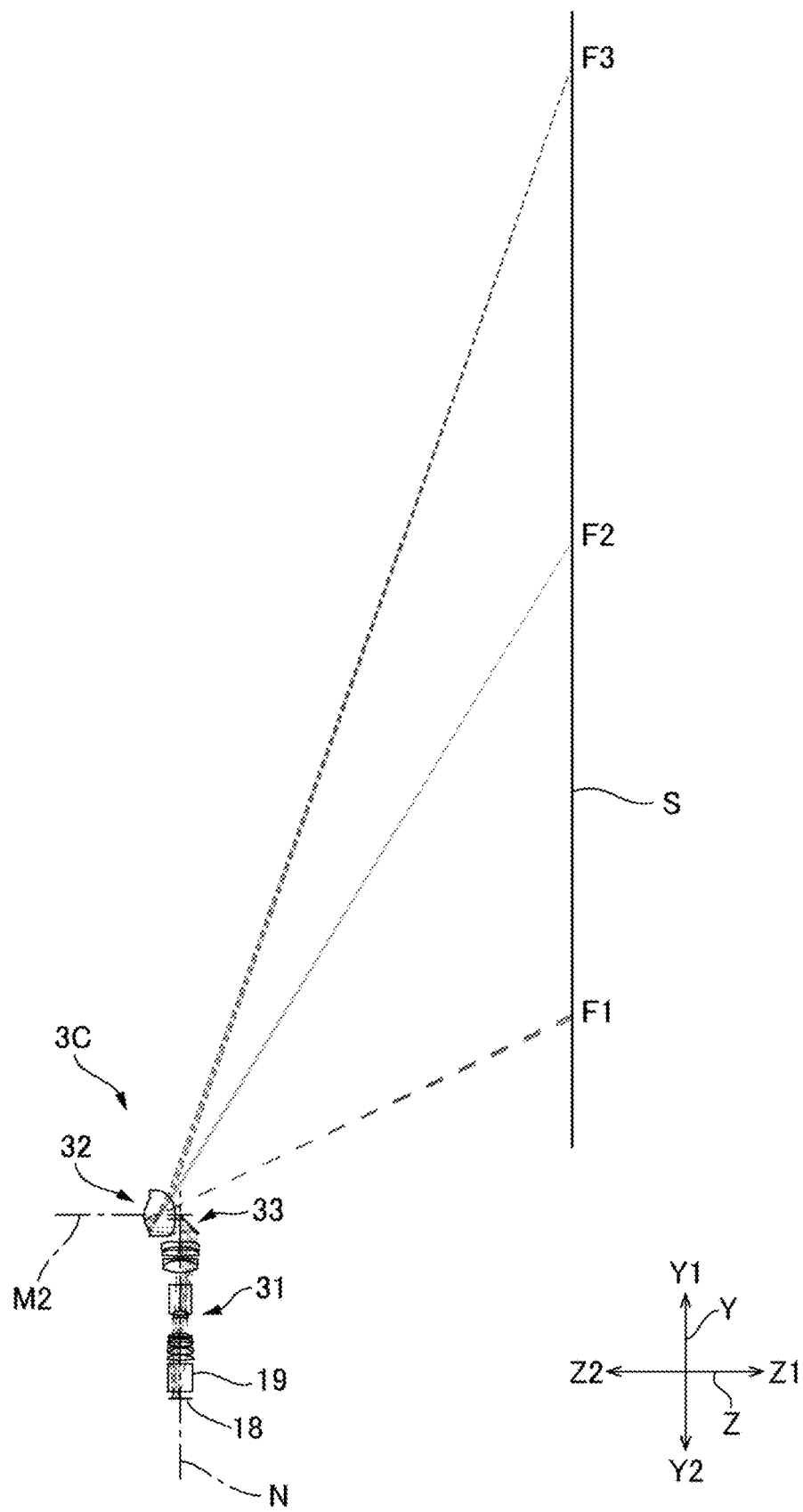
FIG. 16 is a beam diagram diagrammatically showing an entire optical system according to Example 3.
Figure 17:
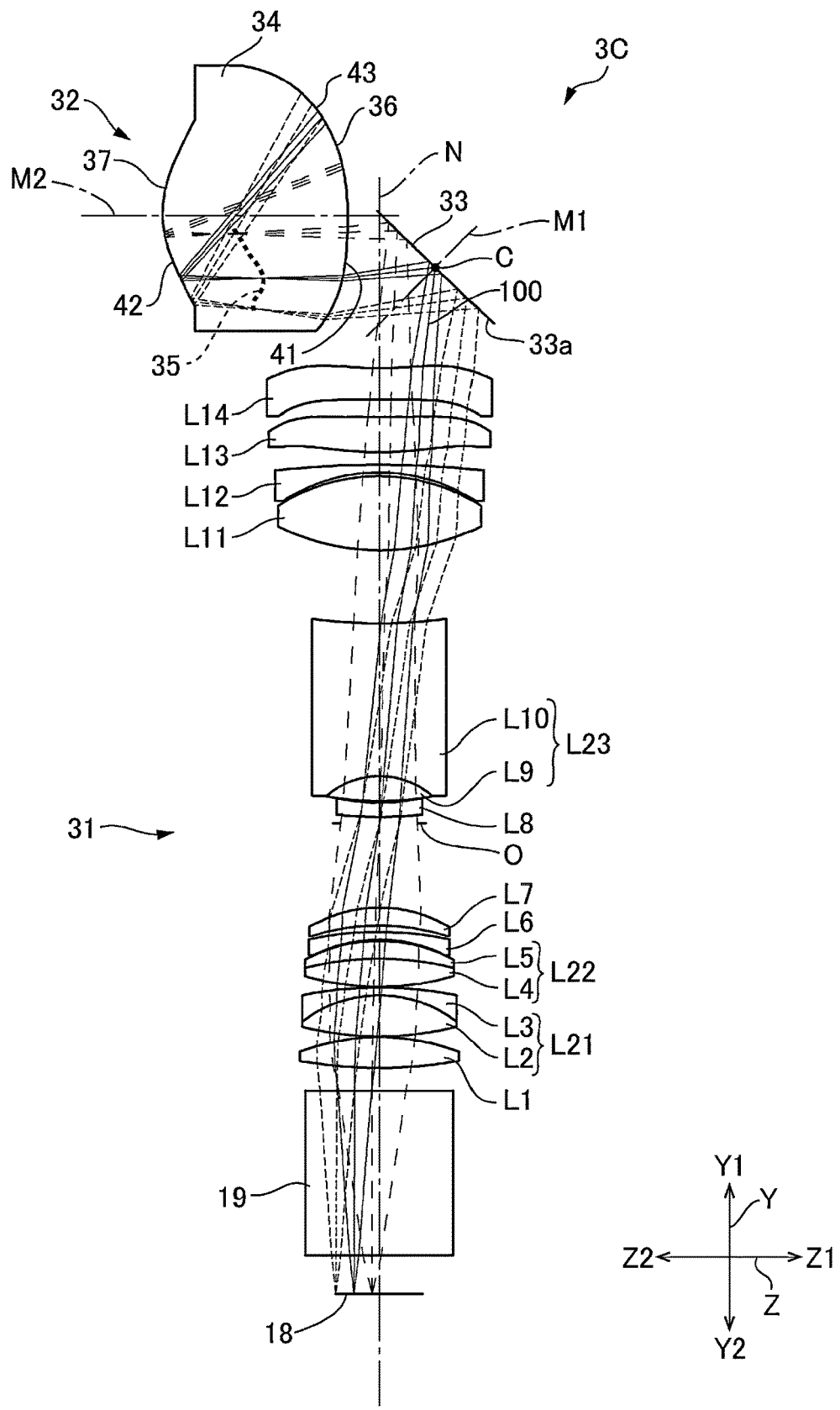
FIG. 17 is a beam diagram of the optical system according to Example 3.
Figure 18:
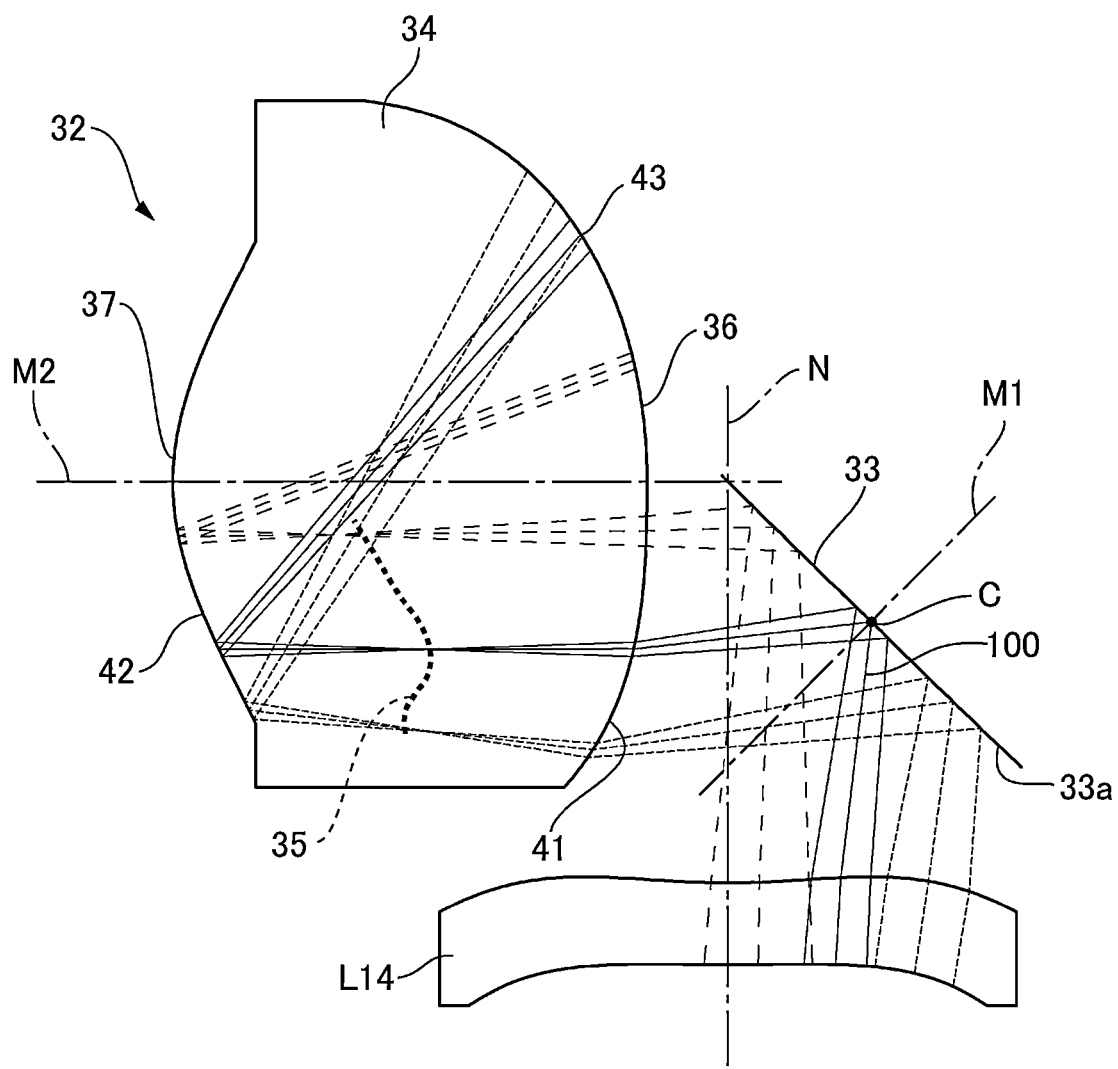
FIG. 18 is a beam diagram showing beams traveling via a lens located in a position closest to the enlargement side in a first optical system, a deflection member, and a second optical system in Example 3.

FIG. 16 is a beam diagram diagrammatically showing an entire optical system according to Example 3. FIG. 16 diagrammatically shows luminous fluxes F1 to F3, which exit out of an optical system 3C according to the present example and reach a screen S. The luminous flux F1 is a luminous flux that reaches a smallest image height position. The luminous flux F3 is a luminous flux that reaches a largest image height position. The luminous flux F2 is a luminous flux that reaches a position between the position that the luminous flux F1 reaches and the position that the luminous flux F3 reaches. FIG. 17 is a beam diagram of the optical system 3C according to Example 3. FIG. 18 is a beam diagram showing beams traveling via a lens located in a position closest to the enlargement side in a first optical system, a deflection member, and a second optical system.

The optical system 3C according to the present example is formed of a first optical system 31 and a second optical system 32 sequentially arranged from the reduction side toward the enlargement side, as shown in FIG. 17.

The first optical system 31 includes 14 lenses L1 to L14 and a deflection member 33. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The deflection member 33 is disposed on the enlargement side of the lens L14. The deflection member 33 is a reflection mirror having a light reflection surface 33a. The deflection member 33 is disposed in a position offset to one side of a first optical axis N of the lenses L1 to L14. The light reflection surface 33a is thus located on the one side of the first optical axis N. The light reflection surface 33a inclines by 45° with respect to the first optical axis N. The beam that exits out of the lens L14 toward the light reflection surface 33a travels in a direction away from the first optical axis N. The optical path of the beam that exits out of the lens L14 toward the enlargement side is deflected by the light reflection surface 33a in the direction perpendicular to the first optical axis N.

In the description, the light reflection surface 33a is a free-form surface. Assuming that an imaginary plane containing the axes Y and Z is a first plane, the light reflection surface 33a has a shape symmetrical with respect to the first plane. In the present example, the light reflection surface 33a is an anamorphic surface. The light reflection surface 33a can instead be an XY polynomial surface, a fringe Zernike polynomial surface, a Zernike polynomial surface, or a Q2D free-form surface. A design axis M1 of the light reflection surface 33a is so set as to pass through a position C, where a chief ray 100 passes, the chief ray 100 being the chief ray of the beam traveling in the direction Y1 of the first optical axis N via the light reflection surface 33a. That is, the design axis M1 of the light reflection surface 33a is displaced from the first optical axis N toward the light reflection surface 33a.

The second optical system 32 is formed of a single lens 34. The lens 34 is made of glass or resin. The lens 34 is shifted in the direction Z2 from the deflection member 33. In more detail, the lens 34 is disposed on the side opposite the light reflection surface 33a with the first optical axis N interposed therebetween. The lens 34 has a first surface 36 oriented in the direction Z1 and a second surface 37 oriented in the direction Z2. The first surface 36 and the second surface 37 each have a convex shape. An optical axis M2 of the lens 34 extends in the axis-Z direction. The optical axis M2 of the lens 34 is therefore perpendicular to the first optical axis N of the lenses L1 to L14 of the first optical system 31. The lens 34 has a reflective coating layer on the second surface 37.

The lens 34 has a first transmission surface 41, a reflection surface 42, and a second transmission surface 43 sequentially arranged from the reduction side. The first transmission surface 41 is provided at the first surface. The first transmission surface 41 therefore has a convex shape. The reflection surface 42 is a reflective coating layer provided on the second surface 37 of the lens 34. The reflection surface 42 therefore has a concave shape to which the surface shape of the second surface 37 is transferred. The optical axis of the reflection surface 42 coincides with the optical axis M2 of the lens 34. The first transmission surface 41 and the reflection surface 42 are arranged in the axis-Z direction. The first transmission surface 41 and the reflection surface 42 are shifted in the direction Y2 from the optical axis M2 of the lens 34. The second transmission surface 43 is provided at the first surface 36. The second transmission surface 43 therefore has a convex shape. The first transmission surface 41 and the second transmission surface 43 are arranged in the axis-Y direction. The second transmission surface 43 is shifted in the direction Y1 from the optical axis M2 of the lens 34.

In the present example, the first transmission surface 41 and the second transmission surface 43 each have an aspherical shape. The reflection surface 42 is a free-form surface. The first transmission surface 41, the reflection surface 42, and the second transmission surface 43 each have a shape symmetrical with respect to the first plane. The reflection surface 42 is an anamorphic surface. The reflection surface 42 can instead be an XY polynomial surface, a Fringe Zernike polynomial surface, a Zernike polynomial surface, or a Q2D free-form surface. The first transmission surface 41, the reflection surface 42, and the second transmission surface 43 are each designed with the optical axis M2 of the reflection surface 42 used as a design reference axis. The reflection surface 42 may not be a free-form surface.

The liquid crystal panels 18 of the image formation section 2 are disposed in the reduction-side conjugate plane of the optical system 3C. The liquid crystal panels 18 form projection images on the side shifted in the direction Z2 from the first optical axis N. The screen S is disposed in the enlargement-side conjugate plane of the optical system 3C. The screen S is shifted in the direction Z1 from the first optical axis N. The height direction of the screen is the direction along the axis Y, and the width direction of the screen is the direction along the axis X.

The optical system 3C forms an intermediate image 35, which is conjugate with the reduction-side and enlargement-side conjugate planes, between the reduction-side conjugate plane and the enlargement-side conjugate plane. In the present example, the intermediate image 35 is formed between the light reflection surface 33a of the deflection member 33 and the reflection surface 42 of the lens 34. More specifically, the intermediate image 35 is formed between the first transmission surface 41 and the reflection surface 42 of the lens 34. The intermediate image 35 is shifted in the direction Y2 from the optical axis M2 of the reflection surface 42.

Lens Data

Data on the lenses of the optical system 3C are listed below. The surfaces of the lenses are numbered sequentially from the reduction side toward the enlargement side. Reference characters are given to the liquid crystal panels, the dichroic prism, the lenses, the deflection member, the first transmission surface, the reflection surface, the second transmission surface, and the screen. Data labeled with a surface number that does not correspond to any of the liquid crystal panels, the dichroic prism, the lenses, the deflection member, the first transmission surface, the reflection surface, the second transmission surface, and the screen is dummy data. Reference character R denotes the radius of curvature. Reference character D denotes the on-axis inter-surface distance. Reference character C denotes the aperture radius, and twice the aperture radius is the diameter of the lens surface. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 7.4449 |
| | 2 | Spherical | Infinity | 3.0000 | | Refraction | 9.1098 |
| | 3 | Spherical | Infinity | 0.0000 | | Refraction | 9.4786 |
| | 4 | Spherical | Infinity | 0.0000 | | Refraction | 9.4786 |
| | 5 | Spherical | Infinity | 0.0000 | | Refraction | 9.4786 |
| L1 | 6 | Spherical | 57.0713 | 4.0187 | 494003.7770 | Refraction | 9.5788 |
| | 7 | Spherical | −27.9108 | 0.1000 | | Refraction | 9.6162 |
| L2 | 8 | Spherical | 38.4451 | 5.4144 | 451900.8212 | Refraction | 9.1787 |
| L3 | 9 | Spherical | −15.5676 | 1.0000 | 841501.2862 | Refraction | 8.9103 |
| | 10 | Spherical | −49.4213 | 0.1000 | | Refraction | 8.9688 |
| L4 | 11 | Spherical | 31.9049 | 3.7009 | 458439.7915 | Refraction | 8.7089 |
| L5 | 12 | Spherical | −36.6050 | 2.3396 | 469827.7958 | Refraction | 8.4515 |
| | 13 | Spherical | −19.3008 | 0.1717 | | Refraction | 8.1998 |
| L6 | 14 | Spherical | −17.8217 | 1.0000 | 830670.3657 | Refraction | 8.1982 |
| | 15 | Spherical | −41.7100 | 0.8200 | | Refraction | 8.1818 |
| L7 | 16 | Spherical | −27.6160 | 2.3528 | 491879.5658 | Refraction | 8.1040 |
| | 17 | Spherical | −16.9399 | 11.0686 | | Refraction | 8.0771 |

-continued

| Reference character | Surface number | Shape | R | D | Glass material | Refraction/reflection | C |
|---|---|---|---|---|---|---|---|
| 0 | 18 | Spherical | Infinity | 0.7894 | | Refraction | 4.9102 |
| L8 | 19 | Spherical | 49.5988 | 1.9135 | 691223.5549 | Refraction | 4.7864 |
| | 20 | Spherical | 23.5700 | 0.2048 | | Refraction | 4.9513 |
| L9 | 21 | Spherical | 38.0540 | 3.2571 | 710409.2810 | Refraction | 4.9520 |
| L10 | 22 | Spherical | −9.8627 | 20.0000 | 797169.4654 | Refraction | 5.1211 |
| | 23 | Spherical | 62.6996 | 9.6112 | | Refraction | 8.3667 |
| L11 | 24 | Spherical | 28.2951 | 9.7032 | 592555.4540 | Refraction | 13.8385 |
| | 25 | Spherical | −23.2121 | 0.4848 | | Refraction | 13.8553 |
| L12 | 26 | Spherical | −21.6667 | 1.0000 | 846663.2378 | Refraction | 13.7635 |
| | 27 | Spherical | −120.7690 | 1.6952 | | Refraction | 14.5205 |
| L13 | 28 | Aspheric | 39.9257 | 4.5299 | E48R_ZEON | Refraction | 14.9486 |
| | 29 | Aspheric | 152.3076 | 2.2365 | | Refraction | 15.4052 |
| L14 | 30 | Aspheric | 244.0190 | 4.1639 | E48R_ZEON | Refraction | 15.3207 |
| | 31 | Aspheric | 39.2850 | 0.3068 | | Refraction | 16.5913 |
| | 32 | Spherical | Infinity | 20.0000 | | Refraction | 16.5529 |
| | 33 | Spherical | Infinity | 0.0000 | | Refraction | 21.5996 |
| 33 | 34 | Anamorphic | 451.8107 | −10.017 | | Reflection | 13.0178 |
| | 35 | Spherical | Infinity | 0.0000 | | Refraction | 16.5293 |
| | 36 | Spherical | Infinity | −4.0000 | | Refraction | 16.5293 |
| 41 | 37 | Aspheric | −107.8255 | −23.4735 | Z330R_ZEON | Refraction | 16.6719 |
| | 38 | Spherical | Infinity | 0.0000 | Z330R_ZEON | Refraction | 12.4050 |
| 42 | 39 | Anamorphic | 11.9050 | 0.0000 | Z330R_ZEON | Reflection | 13.2834 |
| | 40 | Spherical | Infinity | 23.4735 | Z330R_ZEON | Refraction | 24.8649 |
| 43 | 41 | Aspheric | −30.3036 | 65.8130 | | Refraction | 18.0813 |
| | 42 | Spherical | Infinity | 56.8385 | | Refraction | 305.8360 |
| | 43 | Spherical | Infinity | 180.0883 | | Refraction | 523.5620 |
| S | 44 | Spherical | Infinity | 0.0000 | | Refraction | 1213.4099 |

Aspheric constants are listed below.

| Surface number | S28 | S29 | S30 |
|---|---|---|---|
| Radius of curvature in axis-Y direction | 39.9257 | 152.3076 | 244.0190 |
| Conic constant (K) | −0.297488839 | 32.95732564 | 90 |
| Fourth-order coefficient (A) | −5.01388E−05 | −2.03391E−05 | −6.39742E−05 |
| Sixth-order coefficient (B) | 1.47280E−08 | −3.29737E−07 | −3.36064E−07 |
| Eighth-order coefficient (C) | −2.63287E−10 | 4.87510E−10 | 1.05875E−09 |
| Tenth-order coefficient (D) | | | |
| Twelfth-order coefficient (E) | | | |

| Surface number | S31 | S37 | S41 |
|---|---|---|---|
| Radius of curvature in axis-Y direction | 39.2850 | −107.8255 | −30.3036 |
| Conic constant (K) | 0 | 15.00641391 | 1.467641123 |
| Fourth-order coefficient (A) | −1.48251E−04 | −7.63360E−05 | −2.35968E−05 |
| Sixth-order coefficient (B) | 2.77482E−07 | 2.50708E−07 | 1.66107E−07 |
| Eighth-order coefficient (C) | −2.20173E−10 | −9.17212E−10 | −8.79862E−10 |
| Tenth-order coefficient (D) | | 1.87990E−12 | 2.30362E−12 |
| Twelfth-order coefficient (E) | | −2.08377E−15 | −2.57301E−15 |

Anamorphic surface coefficients are listed below.

| Surface number | S34 | S39 |
|---|---|---|
| Radius of curvature in axis-X direction | 451.8107 | 11.9050 |
| Radius of curvature in axis-Y direction | 2153.0363 | 13.3158 |
| Conic constant in axis-Y direction | 0 | −4.12613 |
| Fourth-order coefficient in axis-Y direction | 3.41771E−09 | 4.33133E−05 |
| Sixth-order coefficient in axis-Y direction | −2.99901E−10 | −3.63472E−07 |
| Eighth-order coefficient in axis-Y direction | 8.96537E−14 | 1.30008E−09 |
| Tenth-order coefficient in axis-Y direction | −4.70076E−32 | −2.49970E−12 |
| Conic constant in axis-X direction | 0 | −3.41961 |
| Fourth-order coefficient in axis-X direction | 6.86587E+00 | −4.59189E−04 |
| Sixth-order coefficient in axis-X direction | −2.43235E−01 | −1.32122E−02 |
| Eighth-order coefficient in axis-X direction | 1.21947E+00 | −1.02172E−02 |
| Tenth-order coefficient in axis-X direction | −2.24052E+03 | −9.93177E−03 |

A screen width magnification ratio, a display device width, the numerical aperture, and TR of the optical system 3C are listed below. The screen width magnification ratio is the quotient of the division of the widthwise value in the aspect ratio of the magnified image projected on the screen S by the widthwise value in the aspect ratio of the projection image formed on the surface of each of the liquid crystal panels 18. The display device width is a width dimension of the surface of each of the liquid crystal panels 18 and is expressed in millimeters. The numerical aperture is abbreviated to NA. TR stands for the throw ratio and is the quotient of the division of the projection distance by the axis-X-direction dimension of the projection image projected on the screen S.

Screen width magnification ratio 1.18
Display device width [mm] 8.196
NA 0.218
TR(0.37"16:9) 0.193

Figure 19:
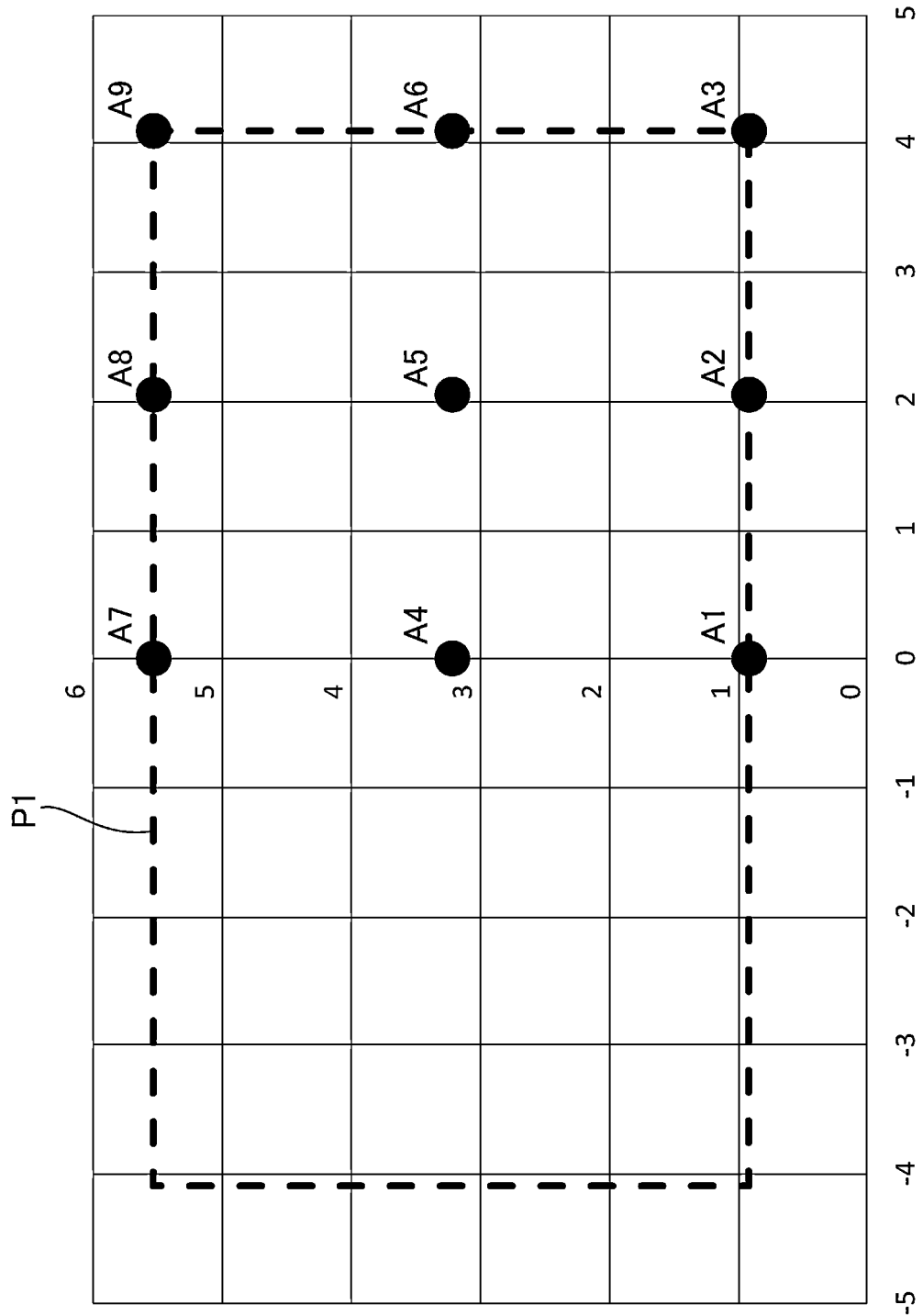
FIG. 19 shows the range of a projection image on liquid crystal panels in Example 3.
Figure 20:
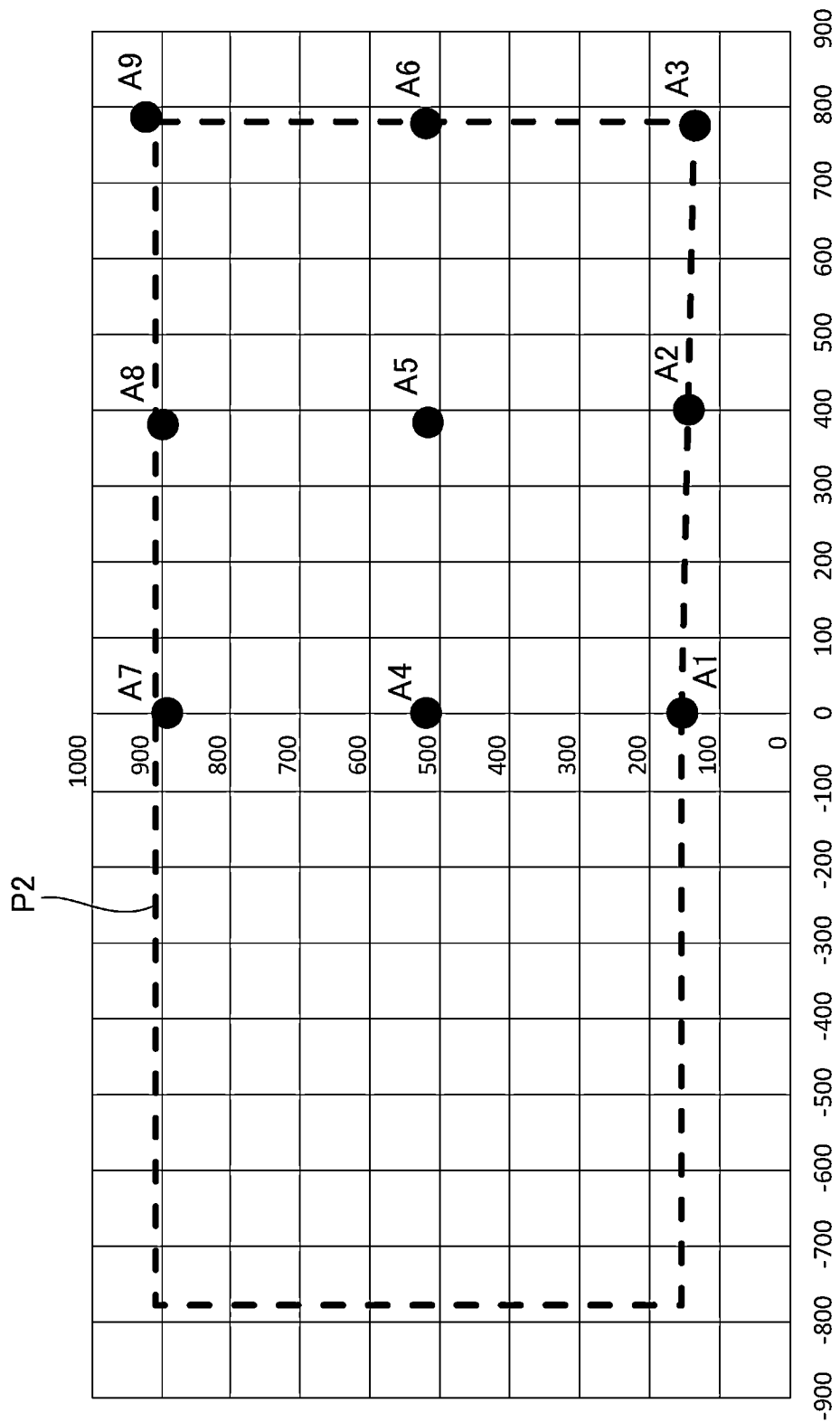
FIG. 20 shows the range of a magnified image on a screen in Example 3.

The screen width magnification ratio in the present example will be described with reference to FIGS. 19 and 20. FIG. 19 shows the range of a projection image P1 on the liquid crystal panels 18. FIG. 20 shows the range of a magnified image P2 on the screen S. The positions of nine luminous fluxes A1 to A9 are set in the right half of the projection image P1 in FIG. 19. "A4" in FIG. 19 represents the central luminous flux at the center of the projection image P1. In the magnified image P2 in FIG. 20, the positions A1 to A9 represent the positions that the luminous fluxes having exited from A1 to A9 in the projection image P1 reach. The optical system 3C according to the present example projects the magnified image P2 having a widthwise value in the aspect ratio being "1.18" times greater than the widthwise value in the aspect ratio of the projection image P1 formed on the liquid crystal panels 18 onto the screen S.

Effects and Advantages of Example 3

The present example relates to the optical system 3C, which forms the intermediate image 35 between the reduction-side and enlargement-side conjugate planes and includes the first optical system 31 and the second optical system 32 disposed on the enlargement side of the first optical system 31. The first optical system 31 includes the deflection member 33 located in a position closest to the enlargement side in the first optical system 31 and having the light reflection surface 33a. The second optical system 32 includes a lens 34 having the first transmission surface 41, the reflection surface 42, and the second transmission surface 43 sequentially arranged from the reduction side toward the enlargement side. The reflection surface 42 and the light reflection surface 33a are each a free-form surface.

According to the present example, the reflection surface 42 of the lens 34 and the light reflection surface 33a of the deflection member 33 are each a free-form surface. The effect of the reflection surface 42 and the light reflection surface 33a therefore allows conversion of the aspect ratio between the projection image in the reduction-side conjugate plane and the magnified image in the enlargement-side conjugate plane. Therefore, for example, as compared with a case where only the effect of the reflection surface 42 causes conversion of the aspect ratio between the projection image and the magnified image, the present example provides a high degree of flexibility in conversion of the aspect ratio. The present example therefore allows conversion of the aspect ratio between the projection image and the magnified image by enlargement the projection image in the axis-X direction.

In the present example, the effect of the reflection surface 42 of the lens 34 and the light reflection surface 33a of the deflection member 33 causes conversion of the aspect ratio between the projection image in the reduction-side conjugate plane and the magnified image in the enlargement-side conjugate plane. The amount of aspect ratio conversion is therefore smaller than that in the optical system according to Example 1, in which the aspect ratio is converted by the effect of the four surfaces. The present example can provide the same effects and advantages as those provided by the optical system according to Example 1 except for the point described above.

Further, in the present example, the part having a free-form surface is formed a plurality of parts, the deflection member 33 and the lens 34. Therefore, for example, even when the quality of the lens 34 varies on a product basis, the quality of the deflection member 33 allows suppression of the amount of produced aberrations. The productivity of the optical system is therefore improved.

Figure 21:
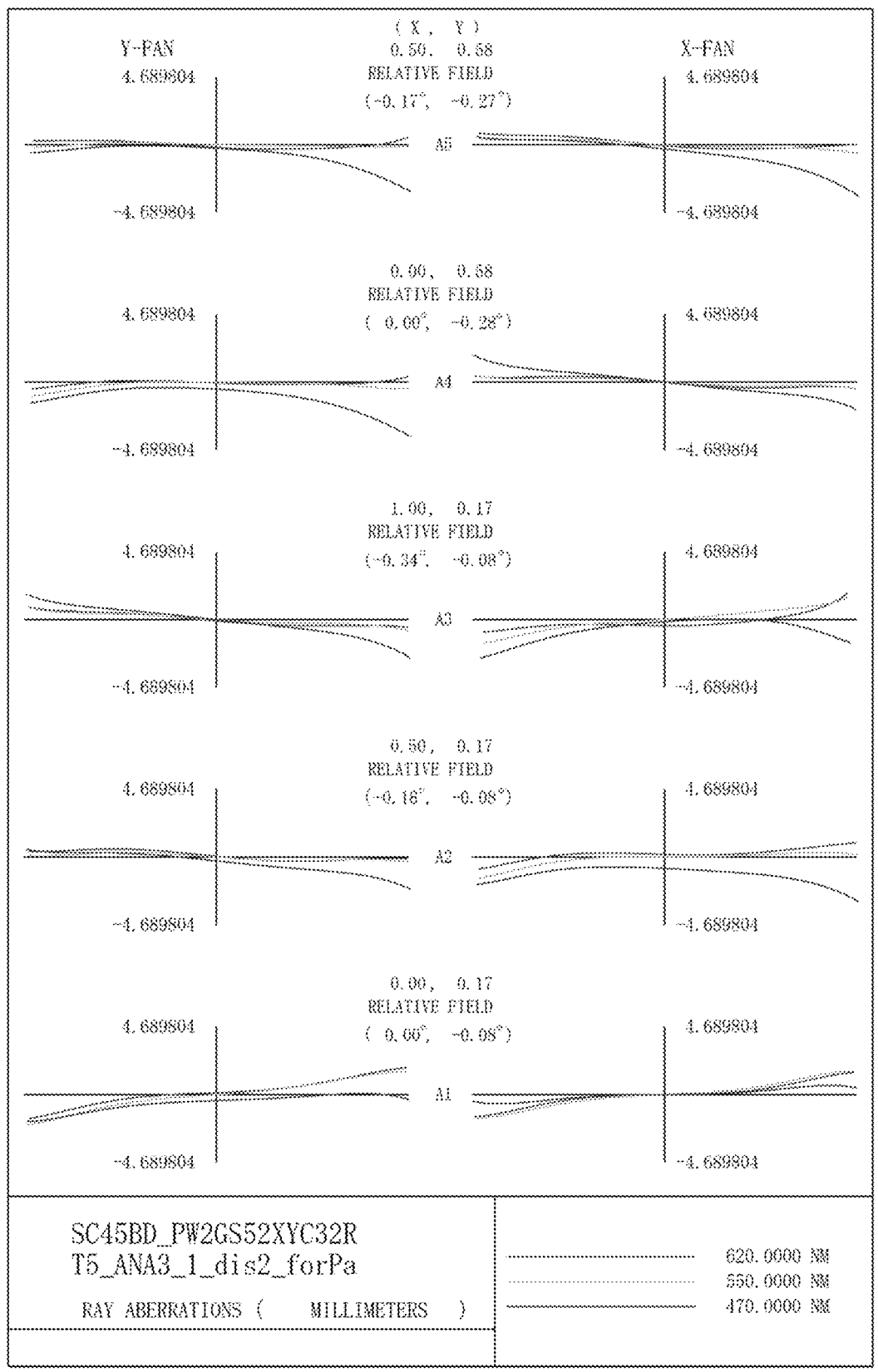
FIG. 21 shows lateral aberrations that occur in the image magnified by the optical system according to Example 3.
Figure 22:
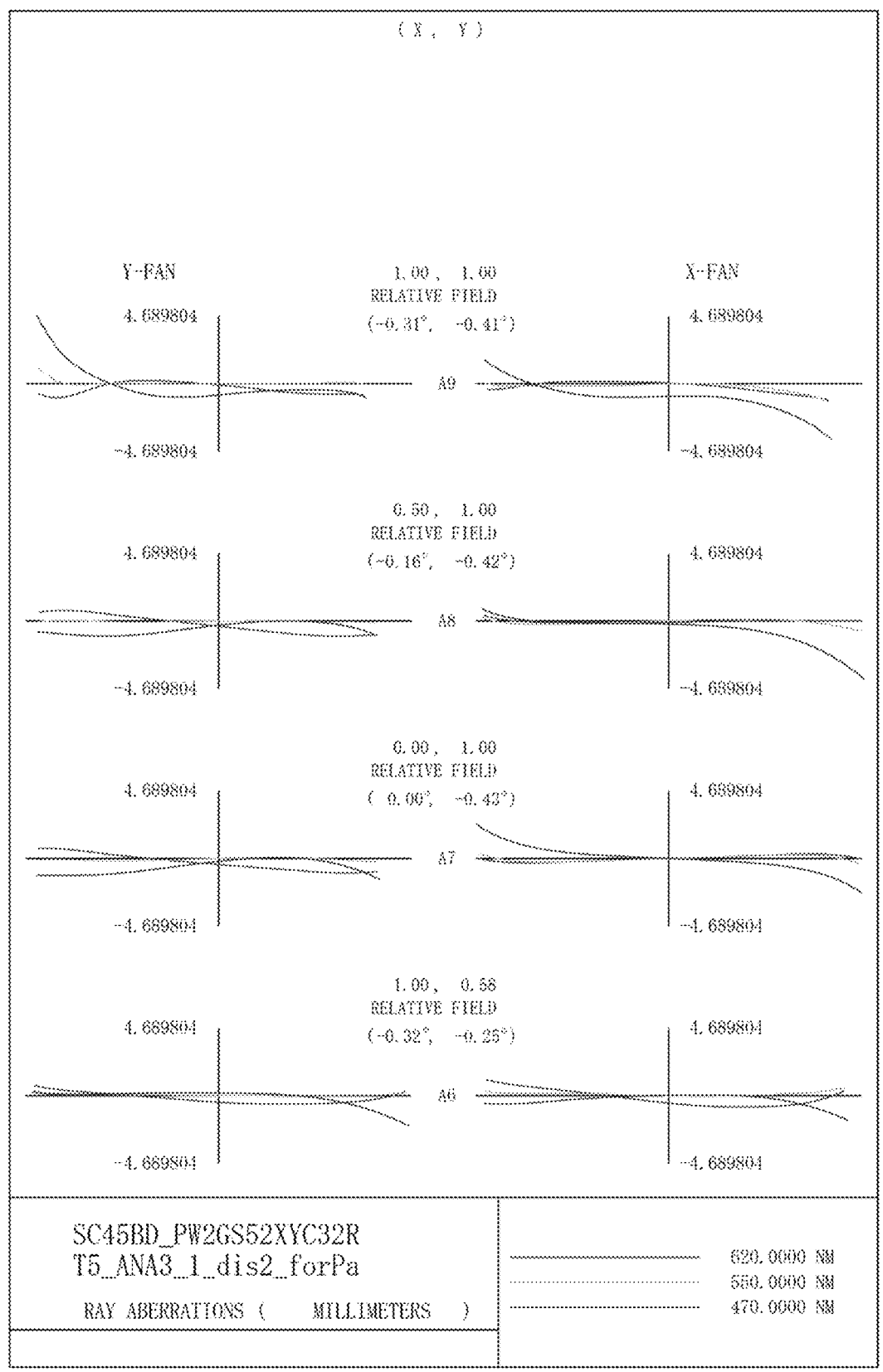
FIG. 22 shows the lateral aberrations that occur in the image magnified by the optical system according to Example 3.

FIGS. 21 and 22 show lateral aberrations that occur in the image magnified by the optical system 3C. In FIGS. 21 and 22, A1 to A9 correspond to the positions of the luminous fluxes A1 to A9 in the magnified image P2 in FIG. 20. The lateral aberrations in the magnified image that are produced by the optical system 3C according to the present example are suppressed, as shown in FIGS. 21 and 22.

Example 4

Figure 23:
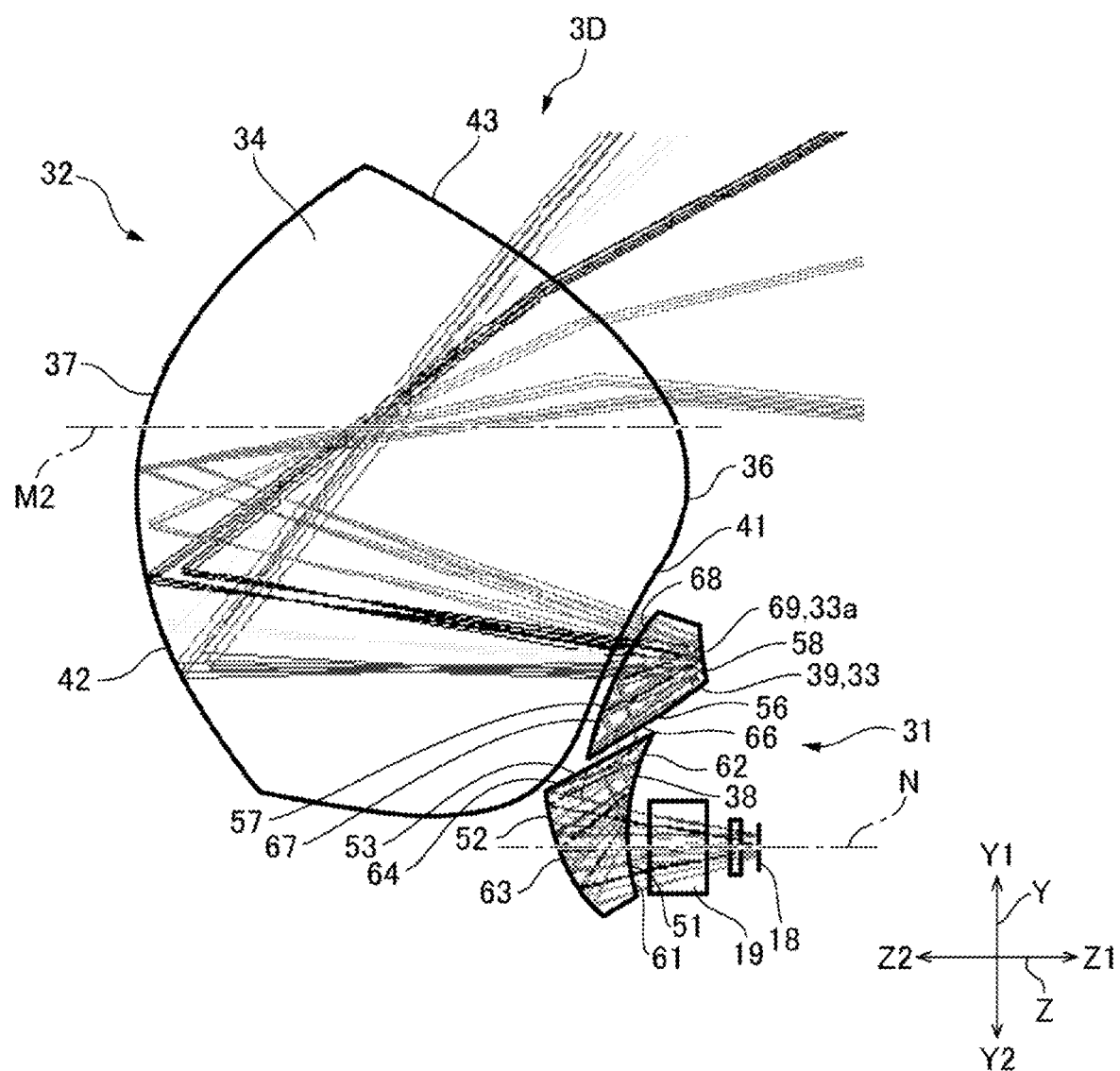
FIG. 23 is a beam diagram of an optical system according to Example 4.

FIG. 23 is a beam diagram of an optical system 3D according to Example 4. In FIG. 23, the same configurations as those in the forms described above have the same reference characters and will not be described. The optical system 3D according to the present example is formed of a first optical system 31 and a second optical system 32 sequentially arranged from the reduction side toward the enlargement side, as shown in FIG. 23.

The first optical system 31 includes a first optical element 38 and a deflection member 39 arranged from the reduction side toward the enlargement side. In the description of the present example, three axes perpendicular to one another are called axes X, Y, and Z for convenience. The direction in which the first optical element 38 and the deflection member 39 are arranged is called an axis-Y direction. The direction in which the liquid crystal panels 18 and the first optical element 38 are arranged is called an axis-Z direction. In the axis-Y direction, the direction toward the side where first optical element 38 is located is called a direction Y2, and the direction toward the side where the deflection member 39 is located is called a direction Y1. In the axis-Z direction, the direction toward the side where the liquid crystal panels are located is called a direction Z1, and the direction toward the side where the first optical element 38 is located is called a direction Z2.

The first optical element 38 has a first surface 51 facing in the direction Z1, a second surface facing away from the first surface 51, and a third surface 53 facing in the direction Y1. The first optical element 38 includes a first reflective coating layer on the first surface 51 in a portion shifted in the direction Y1. The first optical element 38 further includes a second reflective coating layer on the second surface 52. The thus configured first optical element 38 has a light incident surface 61 in the portion shifted in the direction Y2 out of the first surface 51 and a first reflection surface 62 in the portion shifted in the direction Y1 out of the first surface 51. The second surface 52 serves as a second reflection surface 63. The third surface 53 serves as a light exiting surface 64. The beam that passes through the first optical element 38 from the reduction side toward the enlargement side travels via the entrance surface 61, the second reflection surface 63, the first reflection surface 62, and the light exiting surface 64 in the presented order.

The deflection member 39 has a first surface 56 facing the first optical element 38, a second surface 57 facing the second optical system 32, and a third surface 58 facing away from the second surface 57. The deflection member 39 includes a first reflective coating layer on the second surface 57 in a portion facing in the direction Y2. The deflection member 39 includes a second reflective coating layer on the third surface 58. The first surface 56 therefore serves as a light incident surface 66. A portion facing in the direction Y2 out of the second surface 57 serves as a first reflection surface 67, and a portion facing in the direction Y1 out of the second surface 57 serves as a light exiting surface 68. The third surface 58 serves as a second reflection surface 69. The beam that passes through the deflection member 39 from the reduction side toward the enlargement side travels via the light incident surface 66, the first reflection surface 67, the second reflection surface 69, and the light exiting surface 68 in the presented order.

In the description, the second reflection surface 69 (light reflection surface) is a free-form surface. Assuming that an imaginary plane containing the axes Y and Z is a first plane, the second reflection surface 69 has a shape symmetrical with respect to the first plane. In the present example, the second reflection surface 69 is an anamorphic surface.

The second optical system 32 is formed of a single lens 34. The lens 34 is shifted in the direction Z2 from the deflection member 39. The lens 34 has a first surface 36 facing in the direction Z1 and a second surface 37 facing in the direction Z2. The first surface 36 and the second surface 37 each have a convex shape. An optical axis M2 of the lens 34 extends in the axis-Z direction.

The lens 34 has a first transmission surface 41, a reflection surface 42, and a second transmission surface 43 sequentially arranged from the reduction side. The first transmission surface 41 is provided at the first surface 36. The first transmission surface 41 therefore has a convex shape. The reflection surface 42 is a reflective coating layer provided on the second surface 37 of the lens 34. The reflection surface 42 therefore has a concave shape to which the surface shape of the second surface 37 is transferred. The optical axis of the reflection surface 42 coincides with the optical axis M2 of the lens 34. The first transmission surface 41 and the reflection surface 42 are arranged in the axis-Z direction. The first transmission surface 41 and the reflection surface 42 are shifted in the direction Y2 from the optical axis M2 of the lens 34. The second transmission surface 43 is provided at the first surface 36. The first surface 36 therefore has a convex shape. The first transmission surface 41 and the second transmission surface 43 are arranged in the axis-Y direction. The second transmission surface 43 is shifted in the direction Y1 from the optical axis M2 of the lens.

In the present example, the first transmission surface 41, the reflection surface 42, and the second transmission surface 43 are each a free-form surface. The first transmission surface 41, the reflection surface 42, and the second transmission surface 43 each have a shape symmetrical with respect to the first plane. The first transmission surface 41, the reflection surface 42, and the second transmission surface 43 are each an anamorphic surface.

According to the present example, the reflection surface 42 of the lens 34 and the second reflection surface 69 of the deflection member 39 are each a free-form surface. The effect of the reflection surface 42 and the second reflection surface 69 therefore allows conversion of the aspect ratio between the projection image in the reduction-side conjugate plane and the magnified image in the enlargement-side conjugate plane. Therefore, for example, as compared with a case where only the effect of the reflection surface of the lens causes conversion of the aspect ratio between the projection image and the magnified image, the present example provides a high degree of flexibility in conversion of the aspect ratio. The present example therefore allows conversion of the aspect ratio between the projection image and the magnified image by enlargement the projection image in the axis-X direction.

In the present example, the first transmission surface 41 and the second transmission surface 43 are each a free-form surface. The effect of the second reflection surface 69 of the deflection member 39 and the reflection surface 42, the first transmission surface 41, and the second transmission surface 43 of the lens 34 allows conversion of the aspect ratio between the projection image in the reduction-side conjugate plane and the magnified image in the enlargement-side conjugate plane. The amount of conversion can therefore be increased as compared with a case where the aspect ratio is converted by the effect of the two surfaces, the reflection surface and the light reflection surface.

Imaging Apparatus

Figure 24:
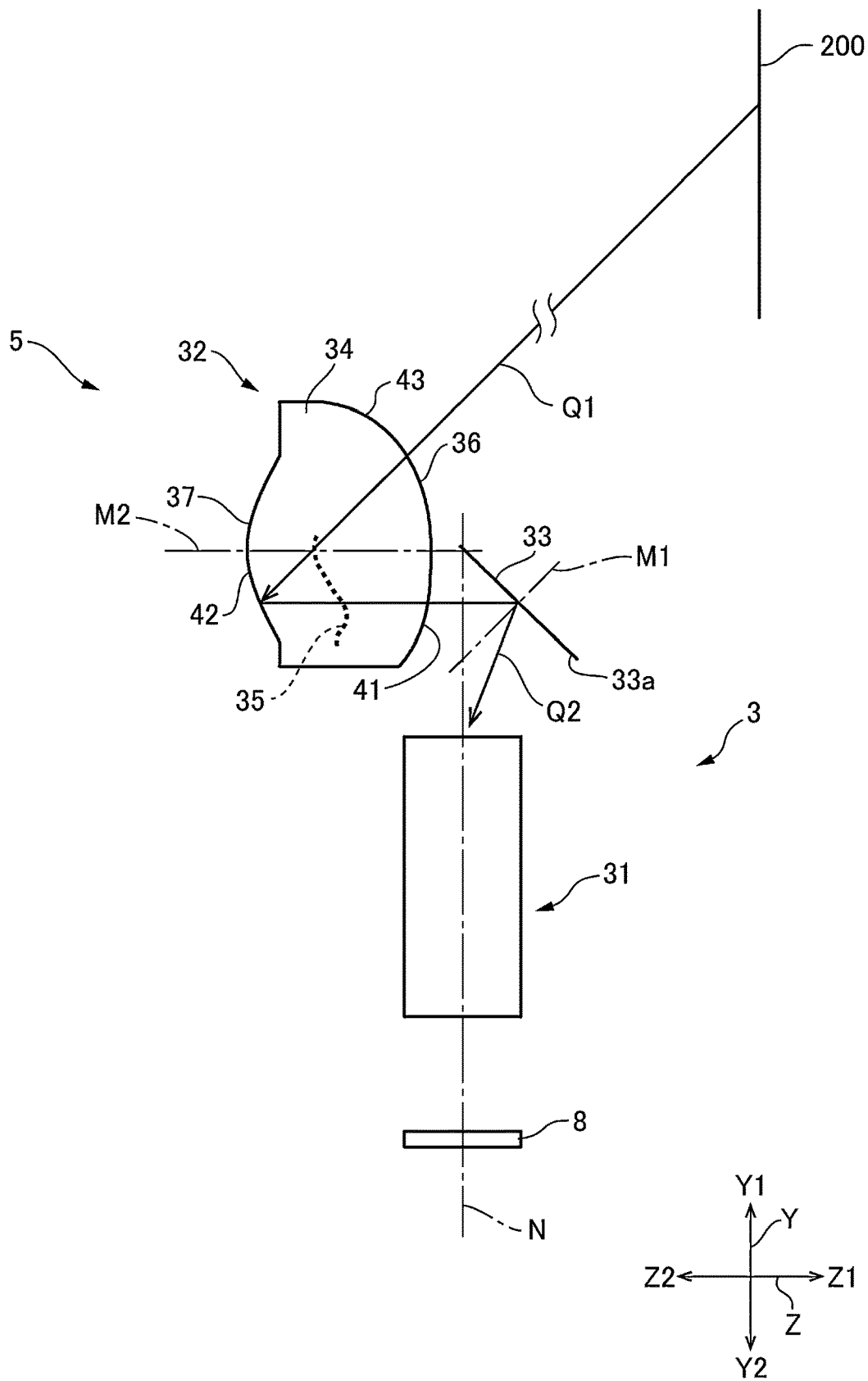
FIG. 24 is a schematic view of an imaging apparatus including an imaging optical system.

FIG. 24 is a descriptive diagram of an imaging apparatus 5 including the optical system 3 according to the present example. The configuration of the optical system 3 according to the present example can be the same as any of the configurations shown in Examples 1 to 4 described above. In the imaging apparatus 5, an imager 8 is disposed in the reduction-side conjugate plane of the optical system 3. In this case, a beam Q1 from the enlargement-side conjugate plane 200 is incident on the second transmission surface 43, which is an upper portion of the first surface 36 of the lens 32 that is shifted in the direction Y1 from the optical axis M2. The beam incident on the second transmission surface 43 is deflected back by the reflection surface 42, which is a lower portion of the lens 32 that is shifted in the direction Y2 from the optical axis M2. A beam Q2 deflected back by the reflection surface 42 exits via the first transmission surface 41 located below the optical axis M2 and travels toward the first optical system 31. The beam that enters the first optical system 31 is brought into focus on the imager 8 disposed in the reduction-side conjugate plane.

In the optical system 3 according to the present example, the reflection surface 42 is a free-form surface. At least one of the first transmission surface 41, the light reflection surface 33a, and the second transmission surface 43 is a free-form surface. Therefore, for example, as compared with a case where only the effect of the reflection surface 42 causes conversion of the aspect ratio between the magnified image in the enlargement-side conjugate plane 200 and the image captured with the imager 8, the present example provides a high degree of flexibility in conversion of the aspect ratio. The present example therefore allows conversion of the aspect ratio between the captured image and the magnified image by enlargement the captured image in the axis-X direction.

What is claimed is:

1. An optical system that forms an intermediate image between a reduction-side conjugate plane and an enlargement-side conjugate plane, the optical system comprising:
a first optical system; and
a second optical system including a lens and disposed on an enlargement side of the first optical system, wherein:
the lens has a first transmission surface, a reflection surface disposed on the enlargement side of the first transmission surface, and a second transmission surface disposed on the enlargement side of the reflection surface,
the intermediate image is formed inside the lens,
at least one of the reflection surface and the second transmission surface is a free-form surface,
the lens has a first surface facing a reduction side and a second surface having a convex shape and facing an opposite side to the first surface, the second surface is provided with a reflective coating layer that is the reflection surface, and the reflective coating layer has a concave shape to which a surface shape of the second surface is transferred.

2. The optical system according to claim 1, wherein the intermediate image is located on a reduction side of the reflection surface.

3. The optical system according to claim 1, wherein the intermediate image is located between the reflection surface and the first transmission surface.

4. The optical system according to claim 1, wherein the first transmission surface is a free-form surface.

5. The optical system according to claim 1, wherein the first transmission surface, the intermediate image, and the reflection surface are located on one side of a second optical axis of the lens, and the second transmission surface is located on another side of the second optical axis.

6. The optical system according to claim 5, wherein a first axis, a second axis, and a third axis are three axes perpendicular to one another, a plane containing the first axis and the second axis is a first plane, and the second optical axis is the first axis, the first transmission surface and the reflection surface are arranged along the first axis, the first transmission surface and the second transmission surface are arranged along the second axis, and the reflection surface has a shape symmetrical with respect to the first plane.

7. The optical system according to claim 6, wherein the second transmission surface has a shape symmetrical with respect to the first plane.

8. The optical system according to claim 7, wherein the first transmission surface has a shape symmetrical with respect to the first plane.

9. The optical system according to claim 1, wherein the first surface has a convex shape.

10. A projector comprising:

a light modulator that modulates light emitted from a light source; and the optical system according to claim 1 that projects the light modulated by the light modulator.

11. An imaging apparatus comprising:

the optical system according to claim 1; and an imager disposed in the reduction-side conjugate plane where light emitted from the optical system is imaged.

12. An optical system that forms an intermediate image between a reduction-side conjugate plane and an enlargement-side conjugate plane, the optical system comprising:

a first optical system including a deflection member; and a second optical system including a lens and disposed on an enlargement side of the first optical system, wherein the deflection member has a light reflection surface and is disposed in a position closest to the enlargement side in the first optical system, the lens has a first transmission surface, a reflection surface disposed on the enlargement side of the first transmission surface, and a second transmission surface disposed on the enlargement side of the reflection surface, and the reflection surface and the light reflection surface are each a free-form surface.

13. The optical system according to claim 12, wherein the second transmission surface is a free-form surface.

14. The optical system according to claim 12, wherein the intermediate image is located between the light reflection surface and the reflection surface.

15. The optical system according to claim 12, wherein the first optical system includes a plurality of optical elements disposed on a reduction side of the deflection member, the light reflection surface is located on one side of a first optical axis of the first optical system, and the first transmission surface is located on another side of the first optical axis.

16. The optical system according to claim 15, wherein a design axis of the light reflection surface is shifted from the first optical axis toward the light reflection surface.

17. A projector comprising:

a light modulator that modulates light emitted from a light source; and the optical system according to claim 12 that projects the light modulated by the light modulator.

18. An imaging apparatus comprising:

the optical system according to claim 12; and an imager disposed in the reduction-side conjugate plane where light emitted from the optical system is imaged.

* * * * *